United States Patent
Schwartz et al.

(10) Patent No.: US 10,356,688 B2
(45) Date of Patent: Jul. 16, 2019

(54) MULTI-DIRECTIONAL RELAY ARCHITECTURE AND APPARATUS AND METHODS OF OPERATION USEFUL IN CONJUNCTION THEREWITH

(71) Applicant: ELTA SYSTEMS LTD., Ashdod (IL)

(72) Inventors: Adi Schwartz, Holon (IL); Yaakov Shoshan, Ashkelon (IL)

(73) Assignee: ELTA SYSTEMS LTD., Ashdod (IL)

( * ) Notice: Subject to any disclaimer, the term of this patent is extended or adjusted under 35 U.S.C. 154(b) by 471 days.

(21) Appl. No.: 14/378,131

(22) PCT Filed: Feb. 12, 2013

(86) PCT No.: PCT/IL2013/050133
§ 371 (c)(1),
(2) Date: Aug. 12, 2014

(87) PCT Pub. No.: WO2013/118129
PCT Pub. Date: Aug. 15, 2013

(65) Prior Publication Data
US 2015/0016330 A1    Jan. 15, 2015

(30) Foreign Application Priority Data
Feb. 12, 2012 (IL) .......................................... 218046

(51) Int. Cl.
*H04W 40/22* (2009.01)
*H04W 76/10* (2018.01)
(Continued)

(52) U.S. Cl.
CPC .......... *H04W 40/22* (2013.01); *H04B 7/1555* (2013.01); *H04B 7/15542* (2013.01);
(Continued)

(58) Field of Classification Search
CPC ..... H04W 40/00; H04W 40/22; H04W 72/00; H04W 72/005; H04W 72/02;
(Continued)

(56) References Cited

U.S. PATENT DOCUMENTS 5,657,317 A    8/1997   West et al.
5,729,826 A    3/1998   Gavrilovich
(Continued)

FOREIGN PATENT DOCUMENTS

JP    2004135209 A    4/2004
WO   2011092698 A1   8/2011
WO   2012120510 A2   9/2012

OTHER PUBLICATIONS

Jacobsen: "Calibration of Camera Systems", ASPRS 2008 Annual Conference, Portland, Oregon, Apr. 28, 2008 (Apr. 28, 2008), pp. 1-8.
(Continued)

*Primary Examiner* — Feben Haile
(74) *Attorney, Agent, or Firm* — Browdy and Neimark, PLLC

(57) ABSTRACT

A cellular communication system serving at least one mobile communication device, the system including at least one backhauling link provided between a mobile station functionality; and a base station functionality residing in a level below the mobile station functionality.

28 Claims, 21 Drawing Sheets

(51) Int. Cl.

| | | |
|---|---|---|
| *H04W 4/90* | (2018.01) | |
| *H04W 76/12* | (2018.01) | |
| *H04W 8/26* | (2009.01) | |
| *H04W 72/04* | (2009.01) | |
| *H04W 28/02* | (2009.01) | |
| *H04W 36/04* | (2009.01) | |
| *H04W 72/02* | (2009.01) | |
| *H04B 7/155* | (2006.01) | |
| *H04B 7/26* | (2006.01) | |
| *H04W 72/00* | (2009.01) | |
| *H04W 8/08* | (2009.01) | |
| *H04J 11/00* | (2006.01) | |
| *H04L 1/00* | (2006.01) | |
| *H04W 4/04* | (2009.01) | |
| *H04W 28/14* | (2009.01) | |
| *H04W 40/02* | (2009.01) | |
| *H04W 76/11* | (2018.01) | |
| *H04W 4/40* | (2018.01) | |
| *H04L 29/12* | (2006.01) | |
| *H04W 40/00* | (2009.01) | |
| *H04W 80/04* | (2009.01) | |
| *H04W 84/00* | (2009.01) | |
| *H04W 84/04* | (2009.01) | |
| *H04W 88/04* | (2009.01) | |
| *H04W 88/08* | (2009.01) | |
| *H04W 88/16* | (2009.01) | |

(52) U.S. Cl.
CPC .......... *H04B 7/2606* (2013.01); *H04J 11/005* (2013.01); *H04J 11/0056* (2013.01); *H04L 1/0018* (2013.01); *H04L 61/2517* (2013.01); *H04W 4/046* (2013.01); *H04W 4/40* (2018.02); *H04W 4/90* (2018.02); *H04W 8/085* (2013.01); *H04W 8/26* (2013.01); *H04W 28/0215* (2013.01); *H04W 28/0268* (2013.01); *H04W 28/14* (2013.01); *H04W 36/04* (2013.01); *H04W 40/02* (2013.01); *H04W 72/005* (2013.01); *H04W 72/02* (2013.01); *H04W 72/042* (2013.01); *H04W 72/0413* (2013.01); *H04W 72/0453* (2013.01); *H04W 76/10* (2018.02); *H04W 76/11* (2018.02); *H04W 76/12* (2018.02); *H04L 2212/00* (2013.01); *H04W 40/00* (2013.01); *H04W 72/00* (2013.01); *H04W 80/04* (2013.01); *H04W 84/005* (2013.01); *H04W 84/045* (2013.01); *H04W 84/047* (2013.01); *H04W 88/04* (2013.01); *H04W 88/08* (2013.01); *H04W 88/16* (2013.01)

(58) Field of Classification Search
CPC ............. H04W 72/0453; H04W 40/02; H04W 72/042; H04W 72/0413; H04W 76/10; H04W 76/12; H04W 76/11; H04W 84/005; H04W 84/047; H04W 84/045; H04W 88/04; H04W 88/08; H04W 88/16; H04W 28/0215; H04W 28/0268; H04W 28/14

See application file for complete search history.

(56) References Cited

U.S. PATENT DOCUMENTS

| | | |
|---|---|---|
| 2009/0029645 A1 | 1/2009 | Leroudier |
| 2009/0040322 A1 | 2/2009 | Leberl et al. |
| 2011/0010329 A1 | 1/2011 | Pichon |
| 2011/0122223 A1 | 5/2011 | Gruber et al. |
| 2011/0188378 A1 | 8/2011 | Collins et al. |
| 2011/0249609 A1* | 10/2011 | Brusilovsky ....... H04B 7/15521 370/315 |
| 2011/0249611 A1 | 10/2011 | Khandekar et al. |
| 2011/0292799 A1 | 12/2011 | Dottling et al. |
| 2011/0305339 A1 | 12/2011 | Blom et al. |
| 2013/0034043 A1* | 2/2013 | Yu ....................... H04W 72/085 370/315 |
| 2014/0024349 A1* | 1/2014 | Poznanski ........... H04M 3/2281 455/414.1 |

OTHER PUBLICATIONS

Zitova B et al: "Image Registration Methods: A Survey", Image and Vision Computing, Elsevier, Guildford, GB, vol. 21, No. 11, Oct. 1, 2003 (Oct. 1, 2003), pp. 977-1000.

Ming-Sui Lee et al: "Pixel and compressed-domain color matching techniques for video mosaic applications", Visual Communications and Image Processing; San Jose, Jan. 20, 2004 (Jan. 20, 2004), Proc. of SPIE-IS&T Electronic Imaging, SPIE vol. 5308.

Meredith M. John "3GPPP Specifications" The mobile broadband standard. www.3gpp.org/specifications. 1-6 (Feb. 2012).

Wikipedia "Multicast-broadcast single-frequency network" https://en.wikipedia.org/w/index.php?title=Multicast-broadcast_single-frequency_network&oldid=474160489, 1-2 (Jan. 2012).

Wikipedia "Multimedia Broadcast Multicast Service" https://en.wikipedia.org/w/index.php?title=Multimedia_Broadcast_Multicast_Service&oldid=462172966. 1-3 (Nov. 2011).

3GPP Organizational partners Technical Specification Group Radio Access Network: Evolved Universal Terrestrial Radio Access (E-UTRA); Relay architectures for E-UTRA (LTE-Advanced) 3GPP TR 36.806 9.0.0 1-34 (Mar. 2010).

* cited by examiner

MULTI-DIRECTIONAL RELAY ARCHITECTURE AND APPARATUS AND METHODS OF OPERATION USEFUL IN CONJUNCTION THEREWITH

FIELD OF THE INVENTION

This invention relates to architecture and data transmission methods for use in cellular networks.

BACKGROUND OF THE INVENTION

A classical cellular network may consist of a Core segment and Radio Access Network (RAN). The RAN may comprise base stations (BS) and mobile stations (MS). Each of the mobile station (MS) is typically connected to one of the BS.

Relaying is considered as a tool to improve e.g. the coverage of high data rates, group mobility, temporary network deployment, the cell-edge throughput and/or to provide coverage in new areas. The relay node is wirelessly connected to the radio-access network via a donor cell. A Full-L3 relay e.g. as shown in FIG. 1 is prior art. More information regarding this technology can be found at 3GPP TR (Technical Report) 36.806.

Prior art relay (e.g. 3GPP TS 36.806) has both access link and backhauling link Prior art relay (e.g. 36.806) uses uplink (UL) to enable upstream (US). Prior art relay (e.g. 36.806) use Downlink (DL) to enable downstream (DS).

SUMMARY OF THE INVENTION

The following terms may be construed either in accordance with any definition thereof appearing in the prior art literature or in accordance with the specification, or as follows:

access link: a Bi-directional link between a relay node (RN) base station functionality and a mobile station (MS) served thereby or between a base station and a mobile station served thereby. Typically has an uplink portion and a downlink portion, both uni-directional.

Backhaul data: data being transferred, typically bi-directionally, over at least one backhauling link.

Backhauling link: Bi-directional link other than an access link e.g. link between relays in adjacent levels or link between relay and static base station or link between relays and relay proxy or link between base station functionality or static base station or relay proxy and core. More generally, a backhauling link bi-directionally links distributed sites to each other or links access points e.g. base stations and a more centralized point e.g. a core. Typically a backhauling link has an uplink portion and a downlink portion, both uni-directional.

base station: one of a plurality of stationary or mobile nodes in a cellular communication network which are sufficiently densely distributed over a served area such that almost all mobile communication devices served by the network can almost always communicate with one another or with a terrestrial network through those nodes, typically including allowing users of such devices to converse and/or exchange digital information between them or with a terrestrial network, via communication paths defined between respective pairs of base station and mobile communication devices.

base station functionality: functionality, typically software implemented, residing on a relay which communicates with an antenna, transmitter and receiver to enable the relay to function as a base station, e.g. to converse and/or exchange digital information between them or with a terrestrial network, via communication paths defined between respective pairs of base station and mobile communication devices.

Bi-directional link: a link between levels of a hierarchical communication network which includes both an uplink and a downlink For example, in FIG. 3, links 01 and 03 are bi-directional.

cell: base station core: server in a cellular communication system that: (1) connects between MSs that are attached to the same core; and/or (2) connects between MSs that are attached to one core with MSs that are attached to a different core; and/or (3) connects MSs attached to the core to other servers such as internet server, terrestrial communication network servers, video servers, gaming servers (not shown).

Core Network: synonym for "core" or core plus network linked thereto.

Ctrl: e.g. as per LTE protocol donor: serving relationship e.g. a base station serving e.g. a relay node Downlink (DL): a uni-directional portion of a link e.g. backhauling or access link from a relay's base station functionality or static base station to a mobile station functionality or mobile station. For example, in FIG. 3, all links between stationary stations or inverse relay (iRelay) proxy to inverse relay (iRelay) mobile station functionalities, and all links between mobile inverse relay (iRelay) and other inverse relay (iRelay), are downlinks.

DL UE or Downlink (DL) UE: downlink to a user entity via a sequence of at least one relays e.g. as shown in FIG. 3 down-stream (DS): flow of data from a higher point at the topology (closer to the core) to a lower point at the topology (further from the core).

eNB: base station, or base station functionality e.g. in a relay, which uses LTE protocol. Also termed herein "LTE base station"

GTP: a group of IP-based communications protocols used to carry General Packet Radio Service (GPRS) within GSM, UMTS and LTE networks.

GTP bearer: A bearer using a GTP protocol

GTP tunnel: A tunnel using a GTP protocol iMME: MME (LTE term for mobility management enhancement) of inverse relay (iRelay), iHSS: HSS (LTE term for home subscriber server) of inverse relay (iRelay)

inverse relay (iRelay): relay, which enables at least one uplink to be used for downstream communication or at least one downlink to be used for upstream communication e.g. inverse relay (iRelay) 10 in FIGS. 3 and 4. Typically, as shown in FIG. 3, the inverse relay includes a downlink, and uplink, an LTE base station (eNB) and a management layer enabling the uplink to be used for downstream communication and/or the downlink to be used for upstream communication. One suitable architecture for an inverse relay is shown in FIG. 17.

IP/S Gw: serving packet gateway of inverse relay (iRelay)

Link: Telecommunications or radio link between nodes of a communication network. It is appreciated that a portion, typically uni-directional, of a typically bi-directional link is also sometimes termed a link. There can be one or more channels in a link, e.g. in LTE all the following channels are uplinks. PUCCH, PUSCH, PRACH.

MBSFN: A non-limiting example of a Downlink (DL)-only transmission protocol. According to Wikipedia, Multicast-Broadcast Single Frequency Network is a communication channel defined in LTE, the fourth-generation cellular networking standard, which can deliver services such as mobile TV using the LTE infrastructure. This enables network operators to offer mobile TV without the need for additional expensive licensed spectrum and without requiring new infrastructure and end-user devices. There is no known commercial deployment of MBSFN.

According to Wikipedia, LTE's Enhanced Multimedia Broadcast Multicast Services (E-MBMS) provides transport features for sending the same content information to all the users in a cell (broadcast) or to a given set of users (subscribers) in a cell (multicast). In contrast, IP-level broadcast or multicast offer no sharing of resources on the radio access level. In E-MBMS it is possible to either use a single eNode-B or multiple eNode-Bs for transmission to multiple LTE mobile station (UE)s. MBSFN is the definition for the latter option.

According to Wikipedia, MBSFN is a transmission mode which exploits LTE's OFDM radio interface to send multicast or broadcast data as a multicell transmission over a synchronized single-frequency network (SFN). The transmissions from the multiple cells are sufficiently tightly synchronized for each to arrive at the LTE mobile station (UE) within the OFDM Cyclic Prefix (CP) so as to avoid Inter-Symbol Interference (ISI). In effect, this makes the MBSFN transmission appear to a LTE mobile station (UE) as a transmission from a single large cell, dramatically increasing the Signal-to-Interference Ratio (SIR) due to the absence of inter-cell interference [4].

MBMS: Multimedia Broadcast Multicast Service including some or all of the technology described in 3GPP TS 25.346.

mobile station or mobile communication device: a portable electronic device which communicates with other such devices or with a terrestrial network via a cellular communication network, typically including allowing users of such devices to converse and/or exchange digital information between them. The device may even comprise a dongle connected to a computer or sensor with no user nearby.

mobile station functionality: functionality, typically software implemented, residing on a relay or inverse relay (iRelay) Proxy which communicates with an antenna, transmitter and receiver to enable the relay or inverse relay (iRelay) Proxy to function as a mobile communication device. Radio bearer, bearer: e.g. as per 3GPP terminology.

relay: a node in the cellular communication network equipped with an antenna, transmitter and receiver and functioning both as a mobile communication device and a base station and extending the coverage of the base-stations. Relay link: link or radio segment between a relay node and a donor base station.

Relay proxy: mobile station functionality connected to the core (optionally through mobile station-Core interface module) and served, via a backhauling link, by base station functionality residing in a topmost level in the hierarchical network (e.g. the base station functionality resides in a relay). Typically, a Relay proxy comprises a mobile station functionality and a mobile station-Core interface module and is a proxy of the relay (one hop) in the core segment. If there is more than one hop e.g. as in FIG. 2, the LTE mobile station (UE) portion of the relay e.g. [2010], together with the interface module forming part of the management layer act together as a relay proxy for the next relay e.g. [2011]. The relay proxy typically decapsulates and encapsulates backhauling control and user data that arrives from or is sent to the core. The relay proxy typically communicates with the management layer of the inverse relay (iRelay), e.g. [2010], through the LTE base station (eNB) of the inverse relay (iRelay) e.g. [2010] in FIG. 2; the management layer than serves as a core proxy from the point of view of the LTE base station (eNB).

Segment: link

Subframe: e.g. as per LTE protocol

Trans. Downlink (DL) backhauling: transmit backhauling using downlink e.g. as per FIG. 11

Tunnel: as per protocols that enables tunneling such as but not limited to GRE and GPRS UE: user entity or mobile station or mobile communication device or mobile station functionality. e.g. in a relay, which uses LTE protocol. Also termed herein "LTE mobile station"

Uplink (UL): a uni-directional portion of a pair of links e.g. of backhauling or access links, from a relay's mobile station functionality or mobile device to a relay's base station functionality or static base station.

Uplink backhaul data: data being transferred uni-directionally, over only the uplink portion of at least one backhauling link, typically from a base station to a core or more generally from an access point to a more centralized point.

upstream (US): flow of data from a lower point in a network topology (i.e. further from the core) to a higher point in a network topology (i.e. closer to the core).

Certain embodiments of the present invention seek to provide an apparatus that includes relay nodes that uses only Downlink (DL) channels as a relay link.

Certain embodiments of the present invention seek to provide an apparatus that includes relay nodes that uses only uplink (UL) channels as a relay link.

Certain embodiments of the present invention seek to provide bi-directional links and multi hops relay using Downlink (DL)-only, or alternatively uplink (UL)-only, channels, typically by providing a relay having functionality of a plurality of LTE mobile stations (UEs).

Certain embodiments of the present invention seek to provide a way to send uplink (UL) backhaul data using base station functionality of the relay.

Certain embodiments of the present invention seek to enable at least one uplink to be used for downstream communication or at least one downlink to be used for upstream communication by providing an inverse relay e.g. as per FIGS. 3, 4 herein and/or a hybrid inverse Relay e.g. as described herein with reference to element 160 in FIG. 16 and/or an inverse relay (iRelay) Proxy including, typically, in software in the management layer, an interface module with relevant functionality.

Other embodiments include:

1. A cellular communication system serving at least one mobile communication device, the system including:
    at least one backhauling link provided between:
    a mobile station functionality; and
    a base station functionality residing in a level below the mobile station functionality.

2. A cellular communication system serving at least one mobile communication device, the system including at least one pair of backhauling links that provides bi-directional communication between relays by utilizing downlink channels only.

3. A cellular communication system serving at least one mobile communication device, the system including at least one pair of backhauling links that provides bi-directional communication between relays by utilizing uplink channels only.

4. A system according to embodiment 1 or 2 or 3 wherein the system also comprises at least one additional pair of backhauling links that provides bi-directional communication between relays by utilizing both an uplink channel and a downlink channel.

5. A system according to embodiment 1 or 2 or 3 wherein at least one pair of backhauling links provides bi-directional communication between relays in different levels by utilizing downlink channels only.

6. A system according to embodiment 1 or 2 or 3 wherein at least one pair of backhauling links provides bi-directional communication between relays in different levels by utilizing uplink channels only.

7. A system according to embodiment 5 or 2 or 3 wherein the pair of backhauling links which provides bi-directional communication between relays in different levels does not utilize any uplink channel.

8. A system according to embodiment 6 or 2 or 3 wherein the pair of backhauling links which provides bi-directional communication between relays in different levels does not utilize any downlink channel.

9. A system according to embodiment 5 or 2 or 3 wherein the mobile communication device, backhauling link, mobile station functionality and base station functionality are all part of an LTE communication network.

10. A system according to embodiment 5 or 2 or 3 wherein all downlink channels comprise MBSFN channels.

11. A system according to embodiment 10 wherein the MBSFN channels of different relays use different subframes.

12. A system according to embodiment 11 wherein the MBSFN channels of different relays use orthogonal subframes.

13. A system according to embodiment 2 or 3 wherein said pair of backhauling links comprises an uplink from a mobile station functionality to a base station functionality residing in a level below the mobile station functionality.

14. A system according to embodiment 2 or 3 wherein said pair of backhauling links comprises a downlink to a mobile station functionality from a base station functionality residing in a level below the mobile station functionality.

15. A system according to embodiment 1 or 2 or 3 wherein said cellular communication system comprises an LTE-standard cellular communication system.

16. A system according to embodiment 1 or 2 or 3 wherein said cellular communication system comprises a WiMax-standard cellular communication system.

17. A system according to embodiment 1 or 2 or 3 wherein said cellular communication system comprises a HSPA-standard cellular communication system.

18. A system according to embodiment 1 or 2 or 3 wherein said cellular communication system comprises a WCDMA-standard cellular communication system.

19. A system according to embodiment 1 or 2 or 3 wherein said cellular communication system comprises a GSM-standard cellular communication system.

20. A system according to embodiment 1 or 2 or 3 wherein said cellular communication system comprises a CDMA-standard cellular communication system.

21. A system according to embodiment 1 or 2 or 3 wherein said cellular communication system comprises a WiFi-standard cellular communication system.

22. A system according to embodiment 1 or 2 or 3 wherein the system also comprises at least one core and a relay level sequence including at least one relay level, each relay level in the sequence including at least one relay having base station functionality and co-located mobile station functionality, and wherein at least one uplink channel is used to enable down-stream data flow.

23. A system according to embodiment 22 wherein only uplink channels are used to enable down-stream data flow.

24. A system according to embodiment 1 or 2 or 3 wherein the system also comprises at least one core and a relay level sequence including at least one relay level, each relay level in the sequence including at least one relay having base station functionality and co-located mobile station functionality, and wherein at least one downlink channel is used to enable up-stream data flow.

25. A system according to embodiment 5 or embodiment 6 or 2 or 3 implemented by a relay which provides functionality of:
a base station; and
a plurality of mobile stations.

26. A cellular communication system serving at least one mobile communication device, comprising mobile station functionality operable in idle mode and enabling a backhauling communication link.

27. A system according to embodiment 26, wherein said backhauling communication link is between relays.

28. A system according to embodiment 27 wherein said backhauling communication link is provided by receiving at least one downlink channel.

29. A system according to embodiment 28, wherein said at least one downlink channel is one of: the following a unicast, broadcast or multicast channel.

30. A cellular communication system having a system core and serving at least one mobile communication device and comprising mobile station functionality, wherein said mobile station functionality includes two communication links, comprising
a radio link between said mobile station functionality and base station functionality and
a second physical link between said mobile station functionality and said system core.

31. A cellular communication system having a system core and serving at least one mobile communication device, comprising mobile station functionality that is directly connected to said system core.

32. A system according to embodiment 26, wherein said backhauling communication link is between relay and core.

33. A system according to embodiment 29, wherein said at least one downlink channel comprises a MBSFN channel.

34. A system according to embodiment 1 or 2 or 3 wherein the system also comprises at least one core and a relay level sequence including at least one relay level, each relay level in the sequence including at least one relay having base station functionality and co-located mobile station functionality, and wherein only downlink channels are used to enable up-stream data flow.

35. A system according to embodiment 34 wherein a proxy mobile station comprising at least mobile station functionality is connected directly to the core and is served, via a backhauling link, by base station functionality.

36. A system according to embodiment 35, wherein said base station functionality resides in a topmost level in said relay level sequence.

37. A system according to embodiment 34 wherein said relay level sequence includes at least one individual relay level atop the bottom-most level and wherein at least one mobile station functionality residing in the individual relay level is connected, via a backhauling link, to a base station functionality residing in a lower level.

38. A system according to any of the preceding embodiments, wherein said cellular communication system has at least one interface operable according to at least one of the following standards: 2G, CDMA, GSM 3G, WCDMA, HSPA, 4G, WiMAX, LTE, LTE-Advanced, WiFi.

39. A system according to any one of previous embodiments, wherein said cellular communication system enables multiple backhauling links between a single relay and more than one entity chosen from a set of: relay, mobile station, mobile station functionality, mobile station proxy and base-station.

40. A system according to any of the preceding embodiments, wherein said cellular communication system enables multiple backhauling links between a single entity in a specific layer and more than one entity in higher layers.

41. A system according to embodiment 40, wherein said single entity has additional backhauling links with more than one entity in lower layers.

42. A cellular communication system serving at least one mobile communication device, the system including:
  apparatus for providing at least one backhauling link between:
    a mobile station functionality; and
    a base station functionality residing in a level below the mobile station functionality.

43. A system according to any of the preceding embodiments, wherein a node that provides mobile station functionality or base station functionality also enables relay functionality operative in accordance with 3GPP TS 36.806.

44. A system according to any of the preceding embodiments, wherein a node that provides mobile station functionality or base station functionality uses both a BCH channel and a MBSFN channel to enable feedback between one node and other node.

45. A system according to any of the preceding embodiments, wherein a node that provides mobile station functionality or base station functionality effects a dynamic allocation of a subframe number and a sub frame quantity.

46. A system according to embodiment 45, wherein said dynamic allocation is derived from at least one mobile station requirements.

47. A system according to any of the preceding embodiments, wherein a node that provides at least one of mobile station functionality and base station functionality uses at least one downlink channel to transmit:
  at least one up-stream backhauling link; and
  at least one down-stream backhauling link.

48. A system according to embodiment 42 wherein said apparatus for providing at least one backhauling link includes an inverse relay, a relay proxy and a mobile-station-core interface module.

49. A method corresponding to any of the preceding embodiments.

BRIEF DESCRIPTION OF THE DRAWINGS

Embodiments will now be described, by way of non-limiting example only, with reference to the accompanying drawings, in which:

Prior art

in FIG. 5, upstream data is transmitted over only a backhauling uplink e.g. employing the architecture of FIG. 4.

in FIG. 6, downstream data is transmitted over only a backhauling downlink e.g. employing the architecture of FIG. 3.

DETAILED DESCRIPTION OF THE INVENTION

Figure 1:
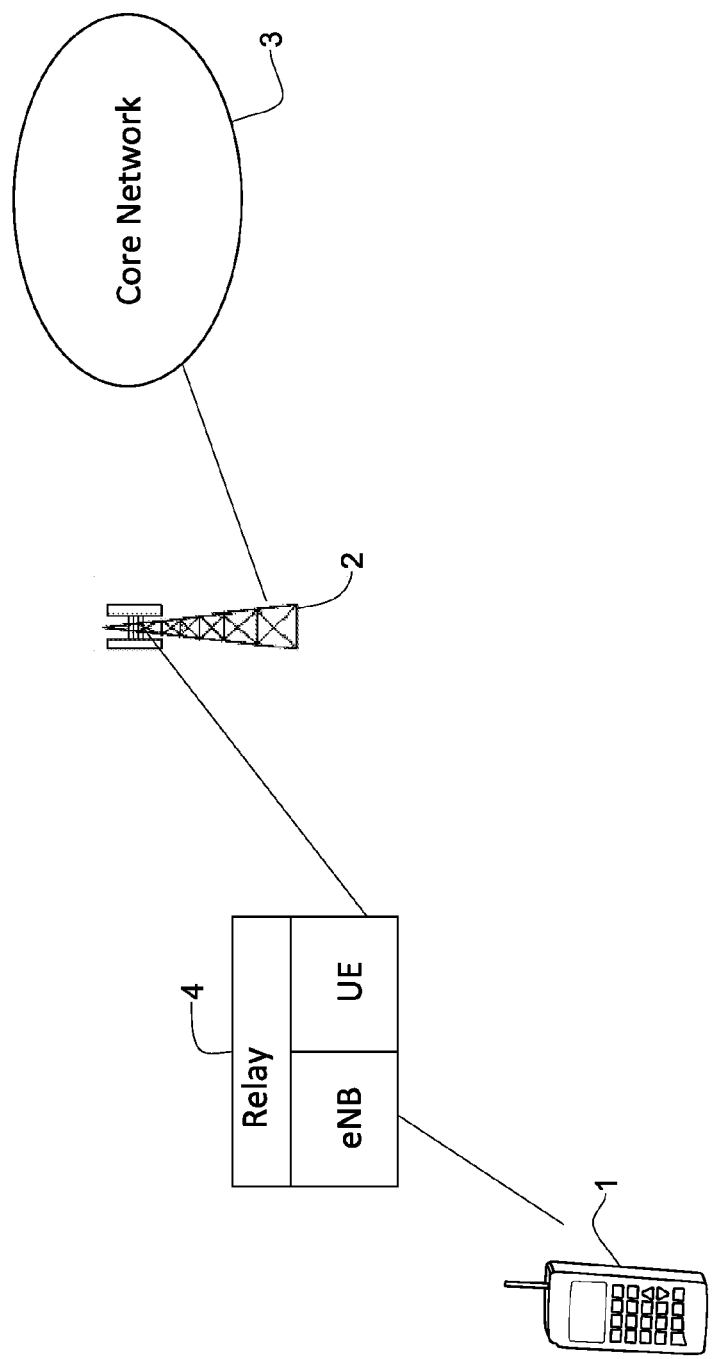
FIG. 1 is an example of prior art L3 relay as depicted in 3GPP TR 36.806.

The present invention has been described with a certain degree of particularity, but those versed in the art will readily appreciate that various alternations and modifications may be carried out without departing from the scope of following claims.

Architecture and methods are described herein which are operative to transfer control and traffic information between each one of the mobile stations, through any hierarchical cellular topology, typically using relays, to any destination e.g. mobile station in the same network or any destination outside the network. Also described is a solution for the 4G 3GPP cellular network, also known as LTE (Long Term Evolution), the principles of which can be applied mutatis mutandis to any hierarchical cellular network of any generation such as but not limited to 2G (GSM), 3G (WCDMA, HSPA), WiMAX or WiFi.

In existing LTE cellular networks, each mobile station is identified by its own IP address, and a packet that is addressed to a mobile station is routed through P\S-GW (Packet-data-network/Serving GateWay) using a GTP (GPRS Tunneling Protocol) tunnel to the base station, and from the base station to the mobile station.

In a hierarchical cellular network the packet is typically routed through several tunnels to the addressed mobile station. Hierarchical cellular networks suitable for this purpose are known and described e.g. in PCT application No. IL2011/000096 entitled "Cellular Communication System with Moving Base Stations and Methods and Apparatus Useful in Conjunction Therewith", filed Jan. 27, 2011; in 3GPP TS 36.806; and in U.S. Pat. No. 5,657,317 to Mahany et al and U.S. Pat. No. 5,729,826 to Gavrilovich.

Certain embodiments seek to provide bi-directional links and multi hop relays using downlink (DL)-only (or uplink (UL)-only) channels, by employing a relay including a plurality of mobile station functionalities (UEs). Such relays are described e.g. in U.S. Patent Application No. 61/451,166 "Cellular communication system utilizing upgraded moving relays", filed 10 Mar. 2011, whose contents were published on 13 Sep. 2012 as: WO/2012/120510 (PCT/IL2012/050072). Embodiments described therein include:

Embodiment 1

A moving cellular communication system comprising:
at least one upgraded moving relay including at least two base station functionalities and/or at least two mobile station functionalities and a radio manager, all co-located,
wherein each base station functionality from among said at least two base station functionalities of said upgraded moving relay is operative to communicate via antennae with at least one mobile station thereby to define a first radio link therebetween,
and wherein each base station functionality has a connection to its co-located radio manager,
wherein each mobile station functionality from among said at least two mobile station functionalities of said upgraded moving relay communicates via antennae with a unit which has base station functionality thereby to define second radio links, respectively,
wherein the radio manager in each individual moving relay comprises:
a radio resource manager; and
functionality for exchanging information with radio managers included in moving relays other than said individual moving relay.

Embodiment 2

The system according to Embodiment 1, wherein at least two of said second radio links communicate with units having base station functionality, located in different geographic locations.

Embodiment 3

The system according to Embodiment 1, wherein said network utilizing bearers serving for conveying communication from a mobile station through a communication route to the core of said cellular communication system, and wherein said upgraded moving relays supporting larger number of bearers compared to a moving relay having one base station functionality and one mobile station functionality, while utilizing said at least two mobile station functionalities.

Embodiment 4

The system according to Embodiment 1, wherein said at least two mobile station functionalities operate substantially simultaneously.

Embodiment 5

The system according to Embodiment 1, wherein said at least two base station functionalities operate substantially simultaneously.

Embodiment 6

The system according to Embodiment 1, wherein said unit which has a base station functionality being a base station.

Embodiment 7

The system according to Embodiment 1, wherein said unit which has a base station functionality forms part of a moving relay.

Embodiment 8

The system according to Embodiment 1, wherein said unit which has a base station functionality forms part of upgraded moving relay.

Embodiment 9

The system according to Embodiment 1, wherein said network further comprising at least one moving relay having one base station functionality and one mobile station functionality.

Embodiment 10

The system according to Embodiment 1, wherein at least two of said second radio links of an upgraded moving relay communicate substantially identical data.

Embodiment 11

The system According to Embodiment 2, wherein at least two of said second radio links of an upgraded moving relay communicate substantially identical data.

Embodiment 12

The system according to Embodiment 1, wherein at least one of said second radio links serves for communicating control data and at least other of said second radio links serves for communicating user data.

Embodiment 13

The system according to Embodiment 1, wherein at least one of said mobile station functionalities within an upgraded moving relay serves as a backup to other mobile station functionality of the same upgraded moving relay, and said radio manager is operative to switch communication from said other mobile station functionality to said backup mobile station functionality in response to meeting a mobile station handover criterion; and

Embodiment 14

The system according to Embodiment 1, wherein at least one of said base station functionalities within an upgraded moving relay serves as a backup to other base station functionality of the same upgraded moving relay, and said radio manager is operative to seamlessly switch communication from said other base station functionality to said backup base station functionality in response to meeting a base station handover criterion.

A mobile L3 (Layer three) relay is provided, according to certain embodiments, which is also capable of providing IP-based services but uses a different relay architecture and network architecture and implements methods for providing the relaying service as described herein. The architecture typically allows one or more of the following options: using downlink (DL) channels only, or uplink (UL) channels only or any combination of downlink (DL)/uplink (UL) channels, to enable full bi-directional relaying capability (e.g. for implementing the backhauling link) In addition, the base-station portion of the relay (e.g. eNB) may be used for providing the backhauling link whereas in conventional systems, the LTE mobile station (UE) portion of the relay is used for the backhauling link Using the base-station portion of the relay for backhauling link (e.g. by using downlink channels) may be advantageous in that any or all of the following may be provided:

- higher data-rates to be transferred (e.g. because downlink (DL) throughputs are higher than the uplink (UL));
- more than a single connectivity between a relay and other network entities (e.g. its higher layer entities in the hierarchical topology, e.g. other relay or base station of the static network) thus solving the bottleneck problem of a hierarchical network;
- an additional way of implementing a wireless X2 connection.

Figure 2:
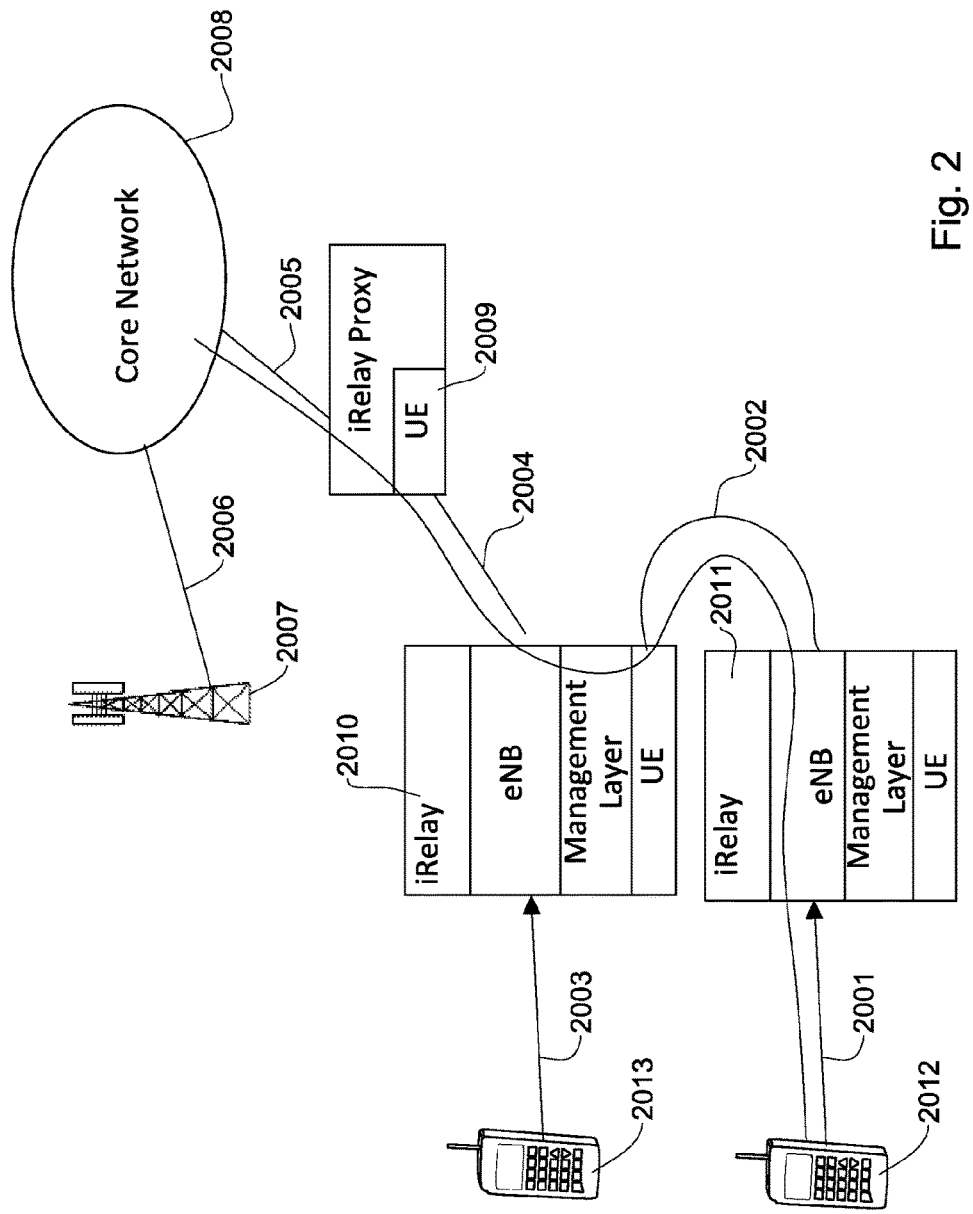
FIG. 2 is an example of relay apparatus that uses an LTE base station (eNB) in order to send backhaul data.

FIG. 2 is an example of a relay apparatus that uses an LTE base station (e.g. eNB) in order to enable a backhauling link. Mobile station [2012], as shown, has an access link [2001] and is connected to and served by (e.g. anchored to as per 3GPP terminology) the LTE base station (eNB) of the inverse relay (iRelay) [2011]. LTE mobile station (UE) portion of the inverse relay (iRelay) [2010] is anchored to LTE base station (eNB) portion of inverse relay (iRelay) [2011], which is used to enable backhauling link [2002]. The LTE mobile station (UE) portion of the inverse relay (iRelay) Proxy [2009] is attached to the LTE base station (eNB) portion of inverse relay (iRelay) [2010] and is used in order to enable backhauling link [2004] to the Core Network [2008].

The Core Network [2008] optionally has additional standard base-stations, e.g. [2007], and connects to these additional standard base-stations using the standard interfaces [2006]. Each of the LTE base station (eNB) parts of the above-mentioned relays can also serve standard mobile stations, e.g. LTE base station (eNB) portion of inverse relay (iRelay) [2010] which serves also mobile station [2013] using standard air-interfaces [2003].

Figure 3:
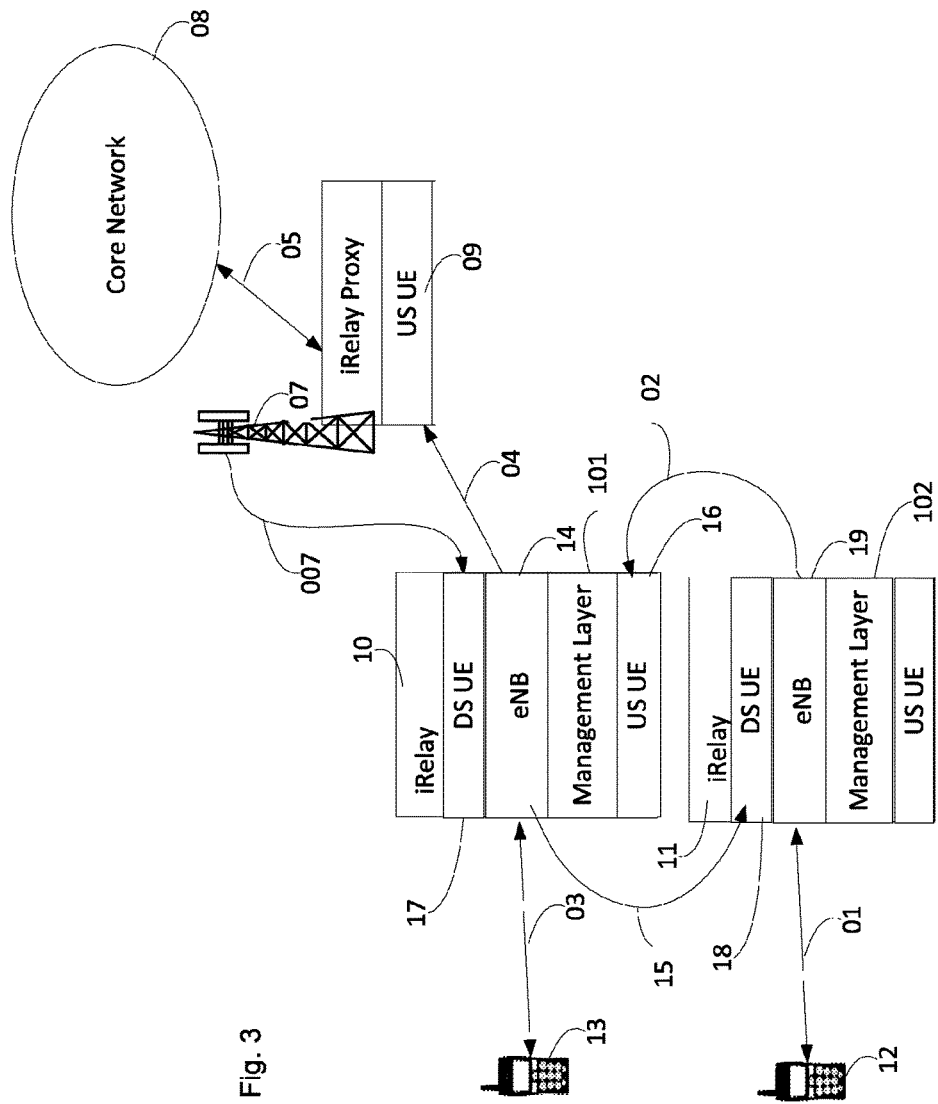
FIG. 3 is example architecture of inverse-relay apparatus that uses only Downlink (DL) channels as a relay link.

FIG. 3 illustrates example architecture of a relay apparatus (termed iRelay) that uses "only downlink (DL) channels" as a relay backhauling link. Each inverse relay (iRelay) apparatus comprises a downstream (DS) LTE mobile station (UE) (e.g. [17], [18]). The downstream (DS) LTE mobile station (UE) may be used in order to enable Down-Stream (DS) backhauling link with other base stations. Any of the base stations may for example comprise other inverse relay (iRelay)'s LTE base stations (eNBs) [14] which may be connected to downstream (DS) LTE mobile station (UE) [18]. Any of the base stations may also comprise a stationary base station [07] typically connected to downstream (DS) LTE mobile station (UE) [17]. The term down-stream refers to a direction (path) in the topology tree which is from the core (root) to the served mobile station (leaf).

In the example, inverse relay (iRelay) [10] enables downstream (DS) backhauling link [007] using its downstream (DS) LTE mobile station (UE) [17] and by using downlink (DL) channels. Inverse relay (iRelay) [11] uses its downstream (DS) LTE mobile station (UE) [18] in order to enable downstream (DS) backhauling link [15] with inverse relay (iRelay) [10] LTE base station (eNB) [14] by using downlink (DL) channels; an upstream (US) LTE mobile station (UE), which is used in order to enable Up-Stream (US) backhauling link. The term up-stream refers to a direction (path) in the topology tree which is from the served mobile station (leaf) to the core (root).

In the example, inverse relay (iRelay) [10] enables an upstream (US) backhauling link using Relay Proxy upstream (US) LTE mobile station (UE) [09] and downlink (DL) channels [04]. Inverse relay (iRelay) [11] uses its LTE base station (eNB) [19] to enable upstream (US) backhauling link by using downlink (DL) channels [02] and upstream (US) LTE mobile station (UE) [16] of inverse relay (iRelay) [10]. A base station, which in the example comprises a standard 4G LTE base station (eNB) (e.g. [14], [19]), may be used for several functionalities. These functionalities may optionally include:

- serving standard MSs using the standard access links (e.g. [03],[01]),
- enabling a multi-hop upstream (US) backhauling link (e.g. [02],[04]) with upstream (US) LTE mobile station (UE) (e.g. [16],[09]) that may reside within either inverse relay (iRelay) or inverse relay (iRelay) Proxy.

Figure 4:
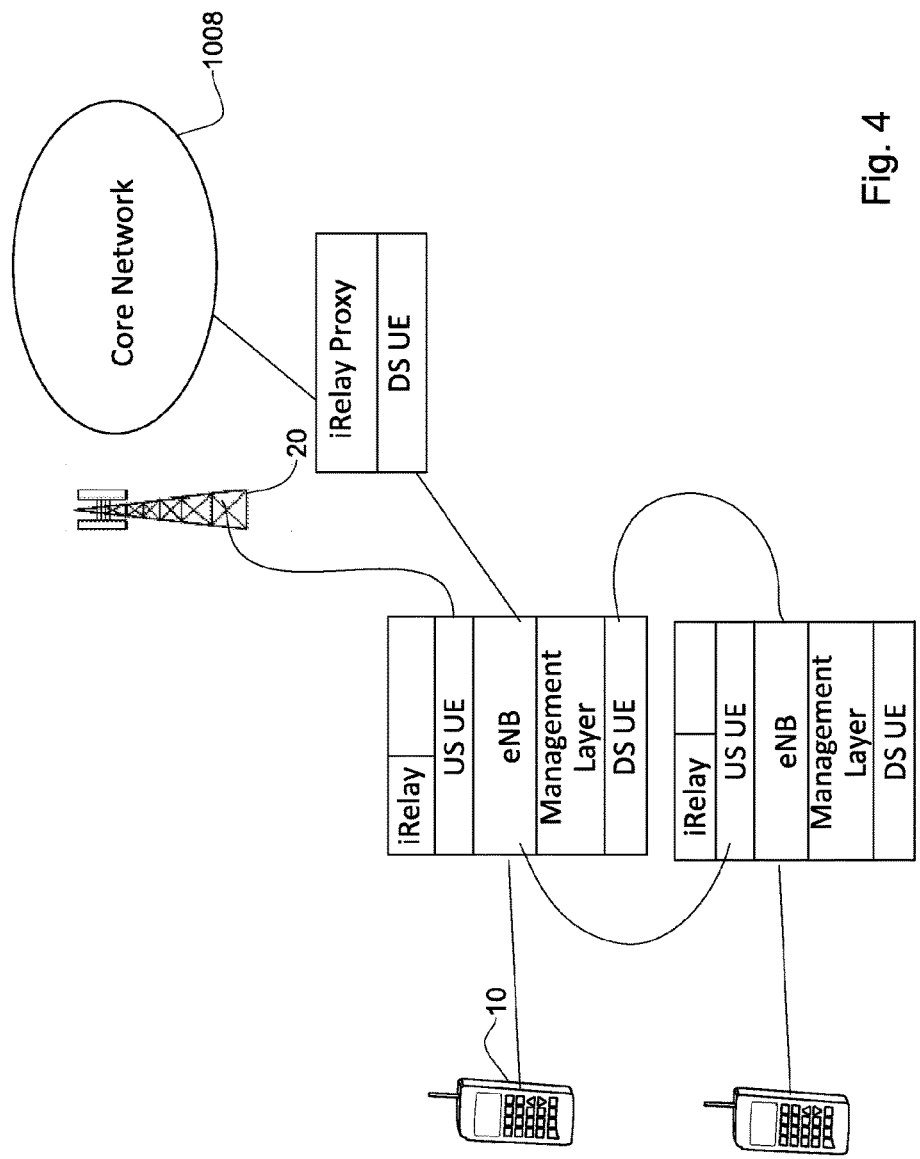
FIG. 4 is example architecture of inverse-relay apparatus that uses only uplink (UL) channels as a relay link.

(in the illustrated embodiment, all upstream (US) backhauling links use only downlink (DL) channels) and/or enabling multi-hop downstream (DS) backhauling link [15] with either relay [11] downstream (DS) LTE mobile station (UE) [18] or inverse relay (iRelay) Proxy downstream (DS) LTE mobile station (UE) (e.g. as per [1009] in FIG. 4). A Management layer (e.g. [101], [102]) may be used in order to collect, sort, analyze and aggregate upstream (US) data of the inverse relay (iRelay)'s LTE base station (eNB) (e.g. [14],[19]) both from standard access links of LTE mobile station (UE)s and from upstream (US) backhauling links of upstream (US) LTE mobile station (UE) of inverse relay (iRelay) that is farther from the core. Then the Management layer forwards the aggregated data back to the inverse relay (iRelay)'s LTE base station (eNB) (e.g. [19],[14]). The eNB may send the aggregated data by upstream (US) backhauling link (e.g. [02],[04]) to a upstream (US) LTE mobile station (UE) (e.g. [16], [09]) that is closer to the core [08] over downlink (DL) channels.

In addition, the Management layer is typically used to collect, sort, analyze and/or decouple access link data, traffic data, control data and backhauling data of other inverse relay (iRelay)s (e.g. [10]) or base stations (e.g. [07]) that comes from the Management layer's inverse relay (iRelay)'s downstream (DS) LTE mobile station (UE) (e.g. [17], [18]). Then the Management layer typically forwards the decoupled data to the Management layer's inverse relay (iRelay)'s LTE base station (eNB) (e.g. [14],[19]).

Using "only downlink (DL) channels" may for example be implemented by LTE MBSFN (Multimedia Broadcast Single Frequency Network) channels. In this channel type, the LTE base station (eNB) transmits downlink (DL) broadcast channel without the need for a uplink (UL) channel.

FIG. 4 illustrates example architecture of a relay apparatus that uses "only uplink (UL) channels" to enable relay backhauling links. Each inverse relay (iRelay) apparatus (e.g. [1010], [1011]) typically comprises some or all of:

a downstream (DS) LTE mobile station (UE) that is used in order to enable downstream (DS) backhauling links. In the example, inverse relay (iRelay) [1010] downstream (DS) LTE mobile station (UE) [1009] is used to enable downstream (DS) backhauling link [1004] between it and LTE base station (eNB) [1014] using uplink (UL) channels, and inverse relay (iRelay) [1010] downstream (DS) LTE mobile station (UE) [1016] is used to enable downstream (DS) backhauling link [1002] with inverse relay (iRelay) [1011] LTE base station (eNB) [1019] by using uplink (UL) channels;

an upstream (US) LTE mobile station (UE) that is typically used in order to enable upstream (US) backhauling link with a base station which may for example comprise another inverse relay (iRelay)'s LTE base station (eNB) (e.g. [1014]) or a stationary base station (e.g. [1007]). In the example upstream (US) LTE mobile station (UE) enables upstream (US) backhauling link [10007] using inverse relay (iRelay) [1010] upstream (US) LTE mobile station (UE) [1017] with its serving base station [1007] by using uplink (UL) channels. Also enabled is upstream (US) backhauling link [1015] using inverse relay (iRelay) [1011] upstream (US) LTE mobile station (UE) [1018] and inverse relay (iRelay) [1010] LTE base station (eNB) [1014]—by using uplink (UL) channels.

A base station, e.g. a standard 4G LTE base station (eNB) (e.g. [1014], [1019]), may be used for some or all of the following:

serve MSs (e.g. UEs such as D03],[1001]), using radio access links enable multi-hop downstream (DS) backhauling links (e.g. [1002],[1004]) by using uplink (UL) channels enable upstream (US) backhauling links (e.g. [1015]) with other base stations using their upstream (US) LTE mobile station (UE) (e.g. [1018]) and by using uplink (UL) channels;

a Management layer (e.g. [10101], [10111]) that is used in order to collect, sort, analyze and/or aggregate upstream (US) data of the inverse relay (iRelay)'s LTE base station (eNB) (e.g. [1014],[1019]) typically both from standard access links of LTE mobile station (UE)s and from upstream (US) backhauling links of upstream (US) LTE mobile station (UE) of inverse relay (iRelay) that is farther from the core. Then the Management layer forwards the aggregated data to the inverse relay (iRelay)'s upstream (US) LTE mobile station (UE) (e.g. [1017],[1018]). This UE may send the aggregated data by upstream (US) backhauling link (e.g. [10007], [1015]) to an LTE base station (eNB) (e.g. [1007], [1014]) that is closer to the core [08] by using uplink (UL) channels.

In addition, the Management layer is typically used to collect, decouple, sort and/or analyze access link data, traffic data, control data and/or downstream (DS) backhauling data of other inverse relays (e.g. [1010]) or inverse relay (iRelay) Proxy downstream (DS) LTE mobile station (UE) (e.g. [1009]) that comes from the Management layer's inverse relay (iRelay)'s LTE base station (eNB) (e.g. [1019], [1014]). Then the Management layer typically forwards the decoupled data to the Management layer's inverse relay (iRelay)'s LTE base station (eNB) (e.g. [1019],[1014]) and/or to the Management layer's inverse relay (iRelay)'s downstream (DS) LTE mobile station (UE) (e.g. [10116],[1016]).

Figure 5:
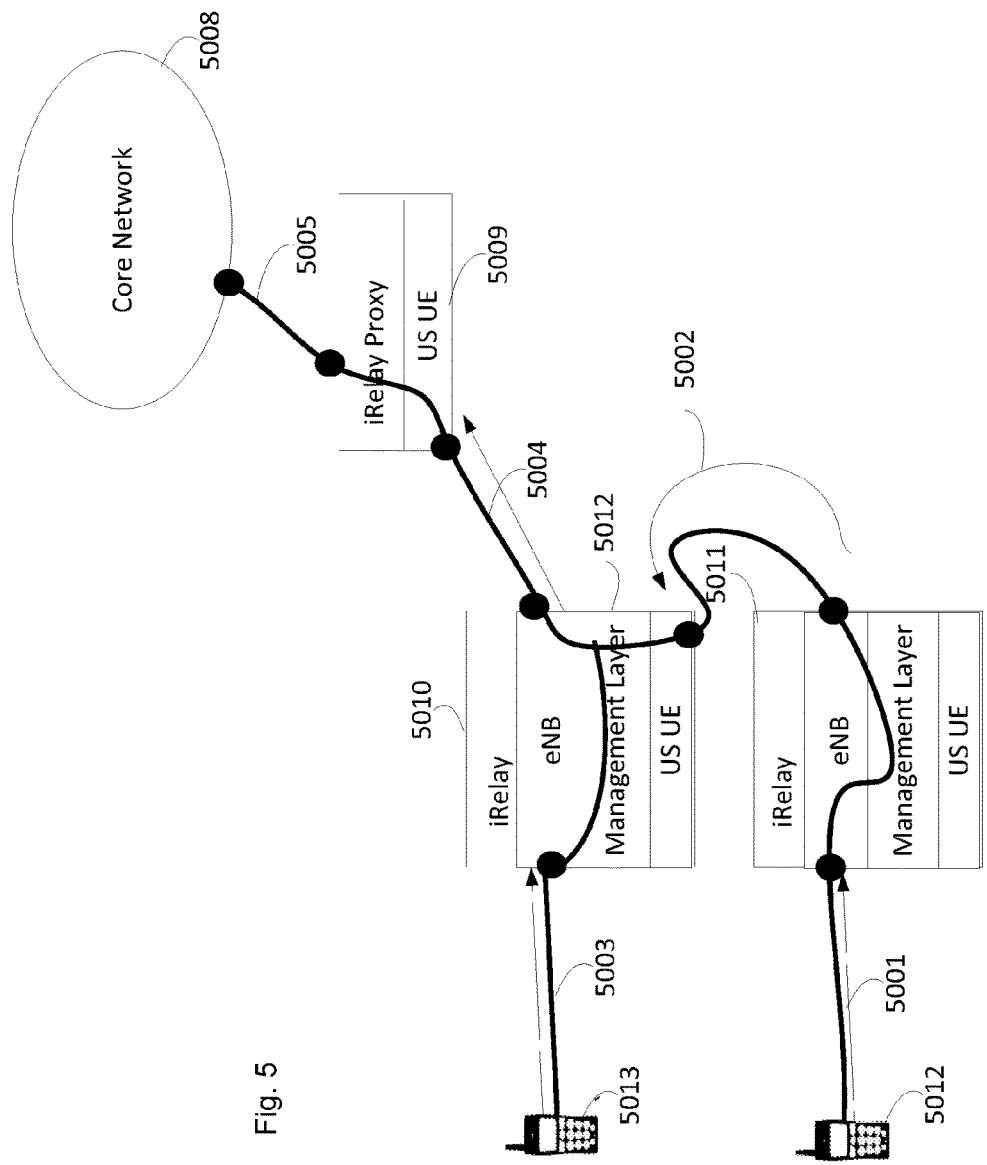
FIG. 5 is an example of aggregated relayed uplink (UL) data that flows from two different mobile stations to the core using an LTE base station (eNB) as a backhauling device.

FIG. 5 is an example of aggregated relayed upstream (US) flows from two different MSs (e.g. UEs) to the core [5008] using inverse relay (iRelay)'s LTE base station (eNB) as a backhauling device. Inverse relay (iRelay) Proxy upstream (US) LTE mobile station (UE) [5009] is connected to the LTE base station (eNB) of inverse relay (iRelay) [5010]. Mobile station [5012] connects to LTE base station (eNB) of the inverse relay (iRelay) [5011] using access link [5001].

The backhauling flow of the LTE base station (eNB) access links of inverse relay (iRelay) [5011] and is routed via the management layer and then back through the same LTE base station (eNB) (of inverse relay (iRelay) [5011]) through an upstream (US) backhauling link [5002] to upstream (US) LTE mobile station (UE) of inverse relay (iRelay) [5010] and from there to the management layer [5012] of inverse relay (iRelay) [5010].

The management layer [5012] aggregates all backhauling data to be transmitted by the backhauling link. This backhauling data typically includes backhauling data from access links of the LTE base station (eNB), e.g. [5003]; and backhauling data (e.g. by link [5002]) arriving from other inverse relay (iRelay)s (e.g. [5011]) that are located farther from the core [5008] than the inverse relay (iRelay) (e.g. [5010]) having said management layer [5012]. The management layer then forwards the aggregated data to one of the following:

local inverse relay (iRelay) [5010] eNB that sends it to one of:

inverse relay (iRelay) Proxy upstream (US) LTE mobile station (UE) [5009] that is connected to the core [5008] by an inverse relay (iRelay) Proxy to core connection [5005]. This connection is enabled using upstream (US) backhauling link [5004] and downlink (DL) channels. The inverse relay (iRelay) Proxy to core connection may be either a wireless or wired connection. In the illustrated example, the connection includes a terrestrial IP connection which is the only option realized.

upstream (US) LTE mobile station (UE) of another inverse relay (iRelay) that is closer to the core.

local inverse relay (iRelay) upstream (US) LTE mobile station (UE) that sends it to one of:

static base station (e.g. eNB) that is connected to a core;

LTE base station (eNB) of another inverse relay (iRelay) that is closer to the core.

Figure 6:
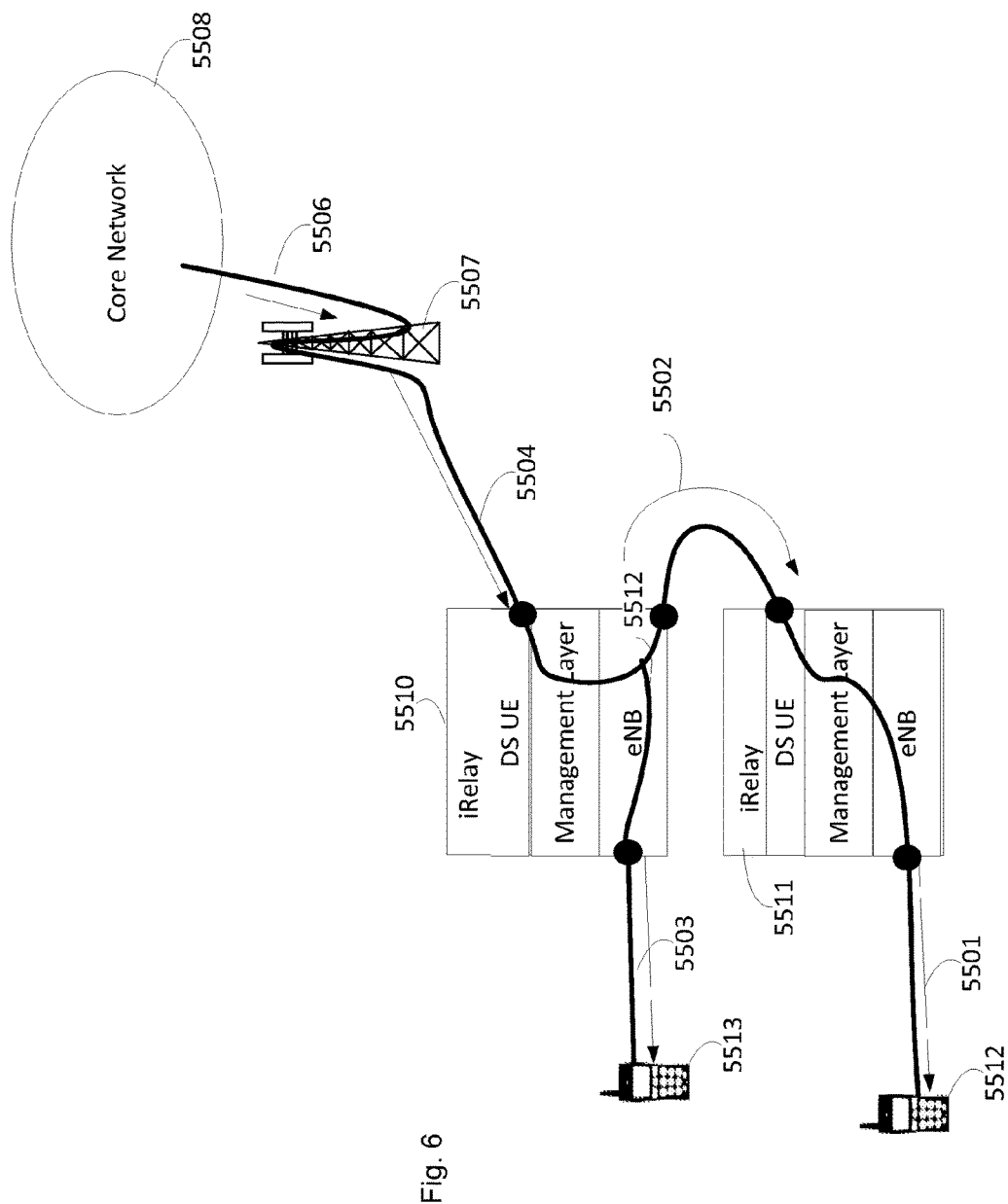
FIG. 6 is an example of aggregated Downlink (DL) relayed data that flows from the core to two different mobile stations using LTE base station (eNB) as a backhauling device.

FIG. 6 is an example of aggregated relayed downstream (DS) flows to two different MSs (e.g. UEs) from the core [5508] using an LTE base station (eNB) as a backhauling device. Downstream (DS) LTE mobile station (UE) of the inverse relay (iRelay) [5510] is connected to a stationary LTE base station (eNB) [5507], and mobile station [5512] connects to the LTE base station (eNB) of the inverse relay (iRelay) [5511] using access link [5501].

The aggregated downstream (DS) data of the stationary LTE base station (eNB) [5507] may travel through the downstream (DS) backhauling link [5504] to the downstream (DS) LTE mobile station (UE) portion of the inverse relay (iRelay) [5510] e.g. by using downlink (DL) channels. Then the downstream (DS) data is transferred to the Management Layer, to be decoupled, sorted and/or analyzed and from there the downstream (DS) data is transferred to the LTE base station (eNB) portion of the inverse relay (iRelay) [5510] to be sent by access link [5503] of mobile station [5513] or downstream (DS) backhauling link [5502] e.g. to downstream (DS) LTE mobile station (UE) portion of inverse relay (iRelay) [5511].

The downstream (DS) backhauling link data of the LTE base station (eNB) portion of inverse relay (iRelay) [5510] is sent e.g. to downstream (DS) LTE mobile station (UE) of inverse relay (iRelay) [5511] and then to inverse relay (iRelay) [5511] Management Layer. The Management Layer again decouples, sorts and analyzes this data, and from there the downstream (DS) backhauling link data as processed by the management layer is transferred to the LTE base station (eNB) portion of the inverse relay (iRelay) [5511] to be sent by access link e.g. [5501] to mobile station e.g. [5512] or downstream (DS) backhauling link.

Figure 7:
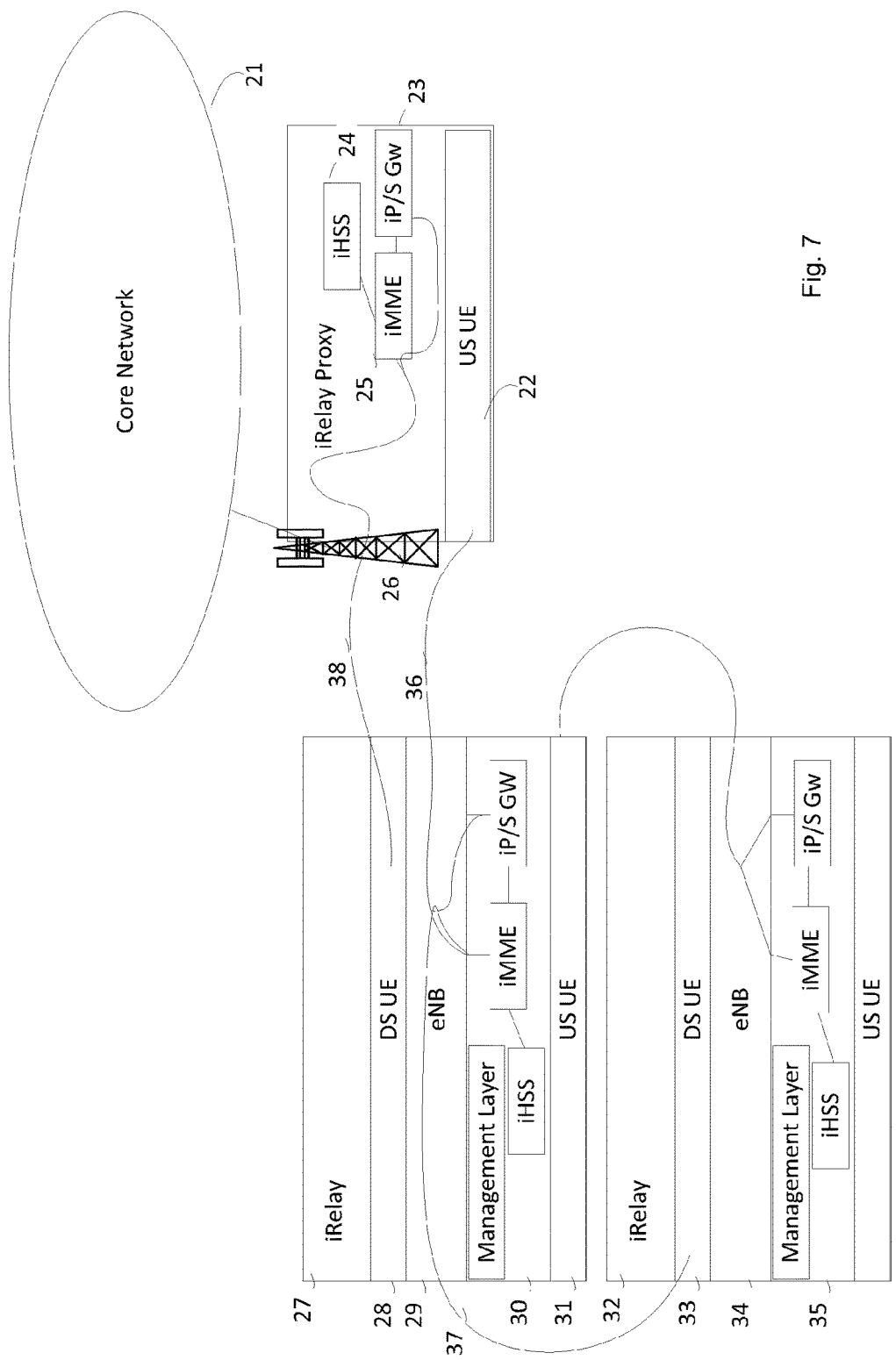
FIG. 7 is a detailed architecture example of the components resides in the inverse relay (iRelay) proxy and in the management layer resides in the inverse relay (iRelay)

FIG. 7 is a detailed architecture example of the components that reside in the inverse relay (iRelay) Proxy [22, 23, 24, 25] and components in the management layer [30, 35] that reside in the inverse relay (iRelay). In order to anchor the LTE mobile station (UE) [22, 28, 31, 33] to the inverse relay (iRelay), a two sided authentication procedure may be carried out. Following this, the LTE mobile station (UE) [22, 28, 31, 33] typically gets an IP address from the iP/S GW [23, 30, 35] portion of the inverse relay (iRelay) and is able to communicate with its serving base station [26, 34, 37].

In order to be able to authenticate the upstream (US) LTE mobile station (UE) and assign an IP address, an optional replicated mini core typically resides inside the management layer [30, 35] or in the inverse relay (iRelay) Proxy [23, 24, 25], which holds the authentication keys in the iHSS and allocates IP addresses using the iP/S GW.

Figure 8:
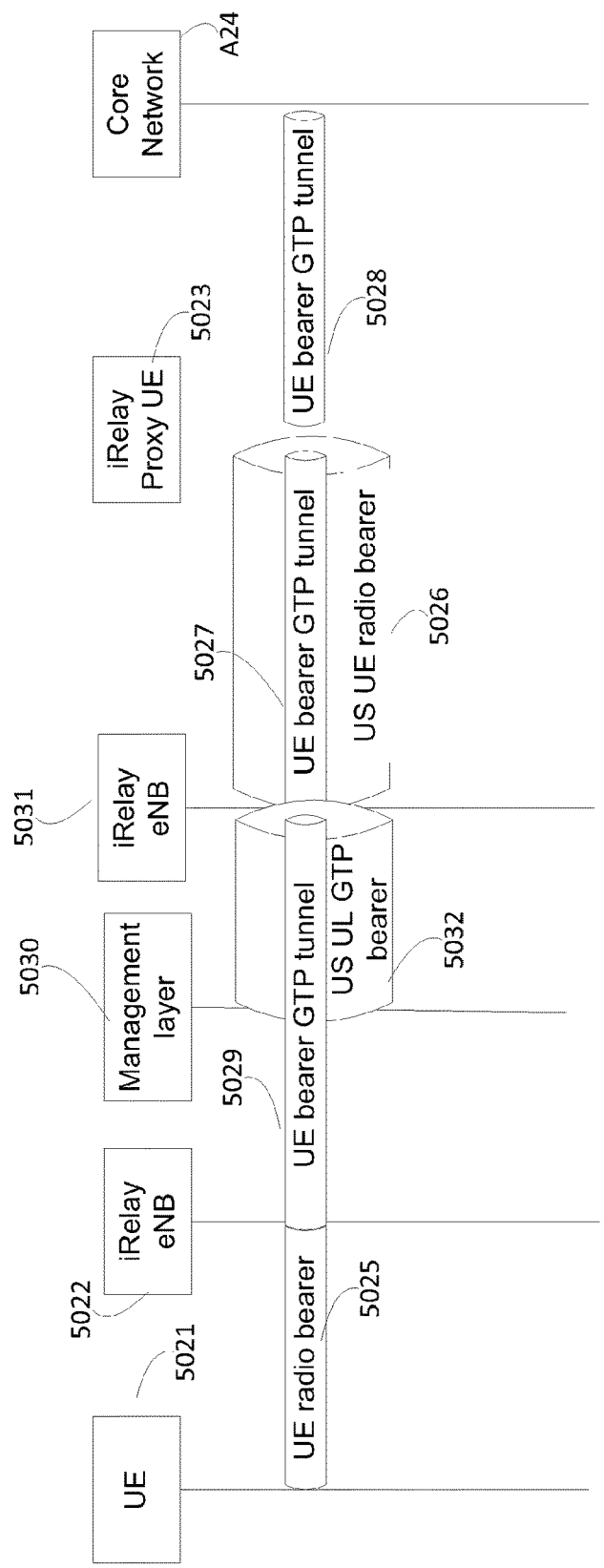
FIG. 8 is an example diagram which illustrates uplink (UL) packet delivery using LTE GTP tunnels and inverse relay (iRelay) architecture.

FIG. 8 is an example diagram which illustrates upstream (US) packet delivery using LTE GTP tunnels and inverse relay (iRelay) architecture. LTE mobile station (UE) [5021] sends uplink (UL) data to its serving inverse relay (iRelay)'s LTE base station (eNB) [5022] over a radio bearer [5025].

The LTE base station (eNB) [5022] sends the uplink (UL) data to the Management layer [5030] over a GTP tunnel [5029]. The GTP tunnel [5029] is looped back from the management layer [5030] back to the LTE base station (eNB) [5031, 5022] over the upstream (US) LTE mobile station (UE) bearer GTP tunnel [5032].

The GTP tunnel of the LTE mobile station (UE) [5029, 5027] is then forwarded to the upstream (US) LTE mobile station (UE) of the inverse relay (iRelay) proxy [5023] over a radio bearer [5026]. The inverse relay (iRelay) proxy [5023] forwards the original LTE mobile station (UE) bearer GTP tunnel to the core [5028] as with inverse relay (iRelay) LTE base station (eNB) [5022]. Each inverse relay (iRelay) Proxy is a proxy of all inverse relay (iRelay)s LTE base station (eNB)s, whose backhauling links are connected to the core by the inverse relay (iRelay) Proxy.

Thereby, typically, the core is linked to a specific inverse relay (iRelay) Proxy that reflects to the core all inverse relay (iRelay) LTE base stations whose backhauling links are connected to the core by the inverse relay (iRelay) Proxy. Thereby, typically, the core "sees" the inverse relay (iRelay) Proxy as the inverse relay (iRelay) LTE base station (eNB)s and communicates with the inverse relay (iRelay) Proxy accordingly. The inverse relay (iRelay) Proxy is seen from the core as one or more LTE base station (eNB)s, whereas from the RAN (radio access network), including the basestations and mobile stations, the inverse relay (iRelay) Proxy is seen as a mobile station, e.g. UE.

Figure 9:
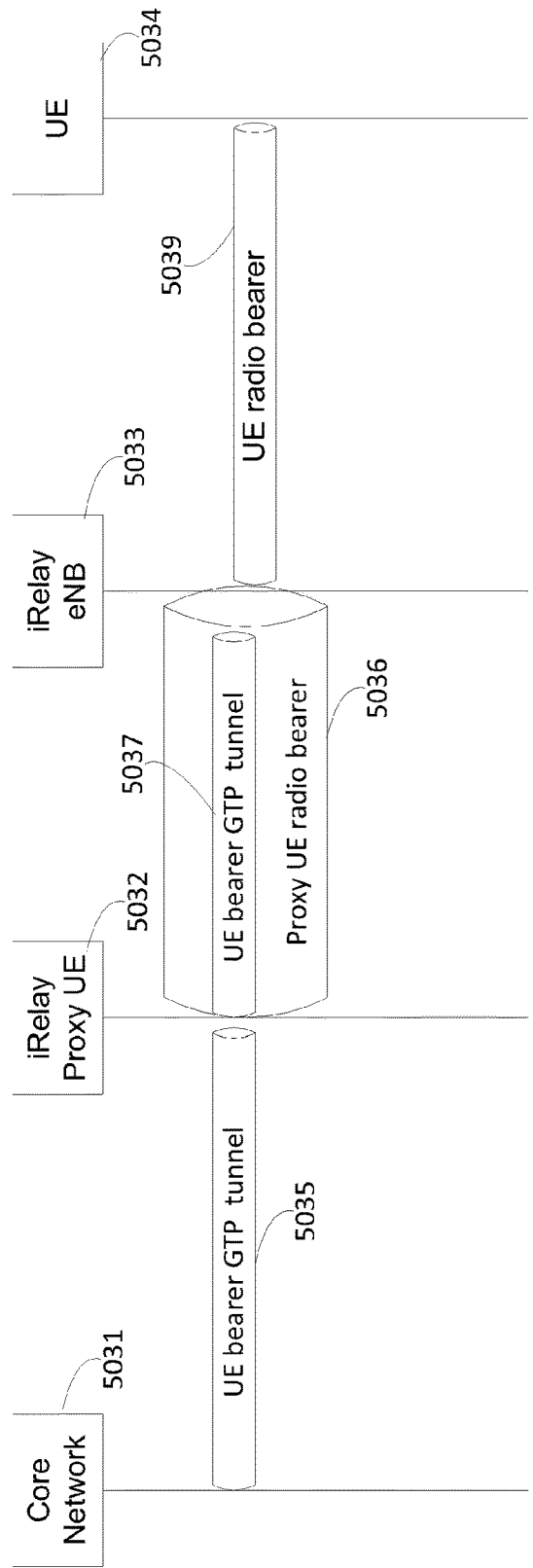
FIG. 9 is an example diagram which illustrates usage of LTE base station (eNB) as a backhauling device using LTE GTP tunnels and inverse relay (iRelay) architecture, e.g. by employing the apparatus of FIG. 2. For example, taking the LTE mobile station (UE) of FIG. 9 to be C13 in FIG. 2, C05 then also contains data from the A35 bearer in FIG. 9, C04 comprises A36 and A39 comprises C03.

FIG. 9 is a similar example to FIG. 2A, only with respect to the downlink (DL). FIG. 9 illustrates usage of LTE base station (eNB) as a backhauling device using LTE GTP tunnels and inverse relay (iRelay) architecture. Downlink (DL) data flows over a GTP tunnel [5035] from the core [5031] to the inverse relay (iRelay) proxy LTE mobile station (UE) [5032] where it serves as a base station from the core's point of view. The LTE mobile station (UE) GTP tunnel [5035, A37] is sent over a radio bearer of the LTE mobile station (UE) [5036] to the inverse relay (iRelay) LTE base station (eNB) [5033].

From A33 (e.g.) the LTE mobile station (UE) GTP tunnel is sent to the management layer over a GTP tunnel of the Proxy LTE mobile station (UE). The management layer loops back the LTE mobile station (UE) GTP tunnel without the Proxy LTE mobile station (UE) GTP tunnel headers. From there the inverse relay (iRelay) LTE base station (eNB) [5033] forwards the downlink (DL) data over a radio bearer [5039] of the LTE mobile station (UE) [5034].

Figure 10:
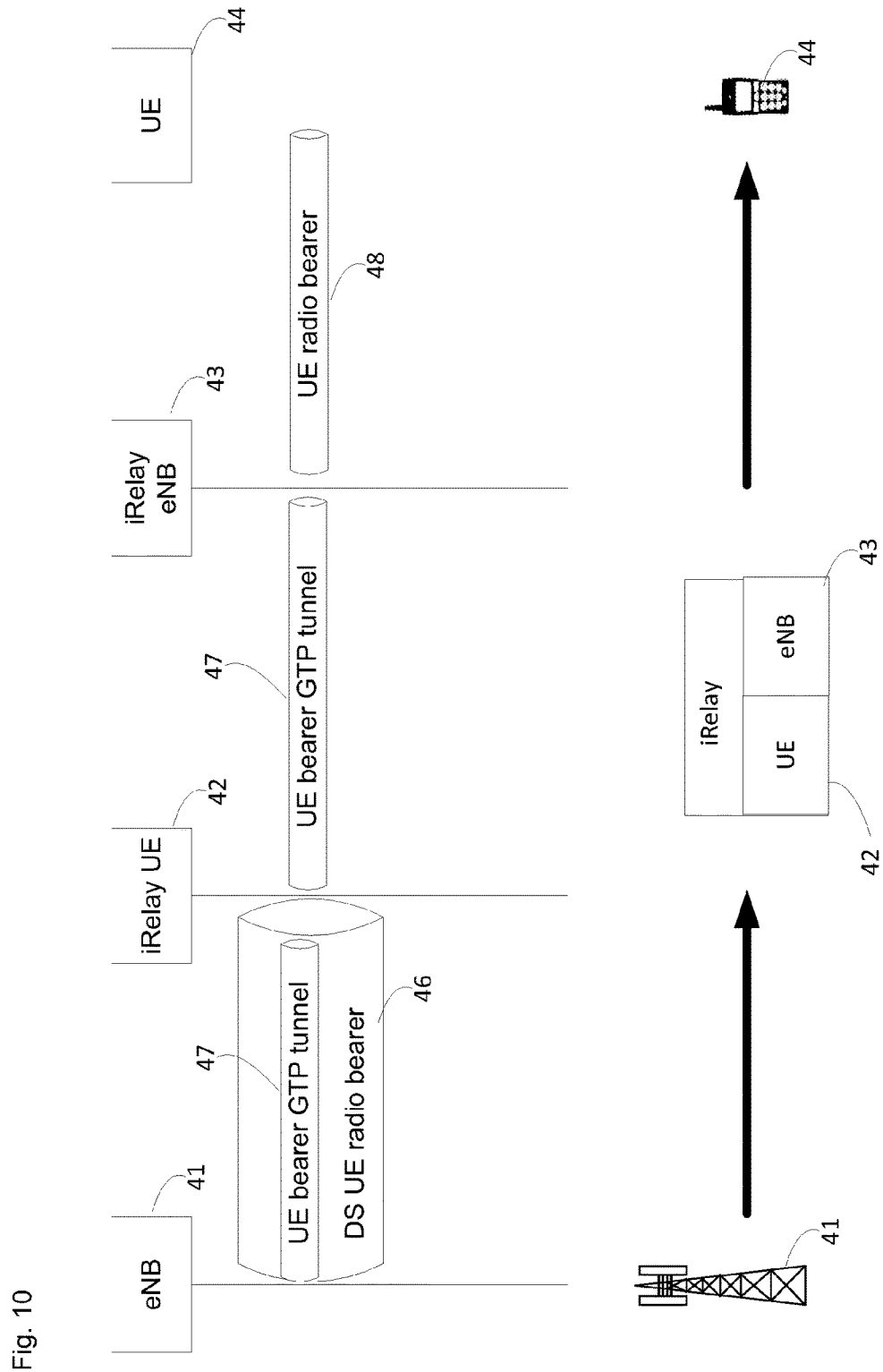
FIG. 10 is an example diagram which illustrates downstream (DS) packet delivery using LTE GTP tunnels and inverse relay (iRelay) architecture.

FIG. 10 illustrates the usage of prior art standard 3GPP TR 36.806 in inverse relay (iRelay) architecture in order to send downlink (DL) packets using LTE GTP tunnels and inverse relay (iRelay) architecture. The lower portion of the drawing shows components [41], [42],[43], [44] operating in the prior art 3GPP TR 36.806 standard, whereas the upper portion of the drawing shows components [41], [42],[43], [44] operating in accordance with inverse relay (iRelay) architecture. As shown, LTE mobile station (UE)'s downlink (DL) data goes over GTP tunnel [47] over DS backhauling link [46] of the inverse relay (iRelay) LTE mobile station (UE) [42] and from there through the LTE base station (eNB) [43] of the inverse relay (iRelay) to the access link [48] of the LTE mobile station (UE) [44].

Figure 11:
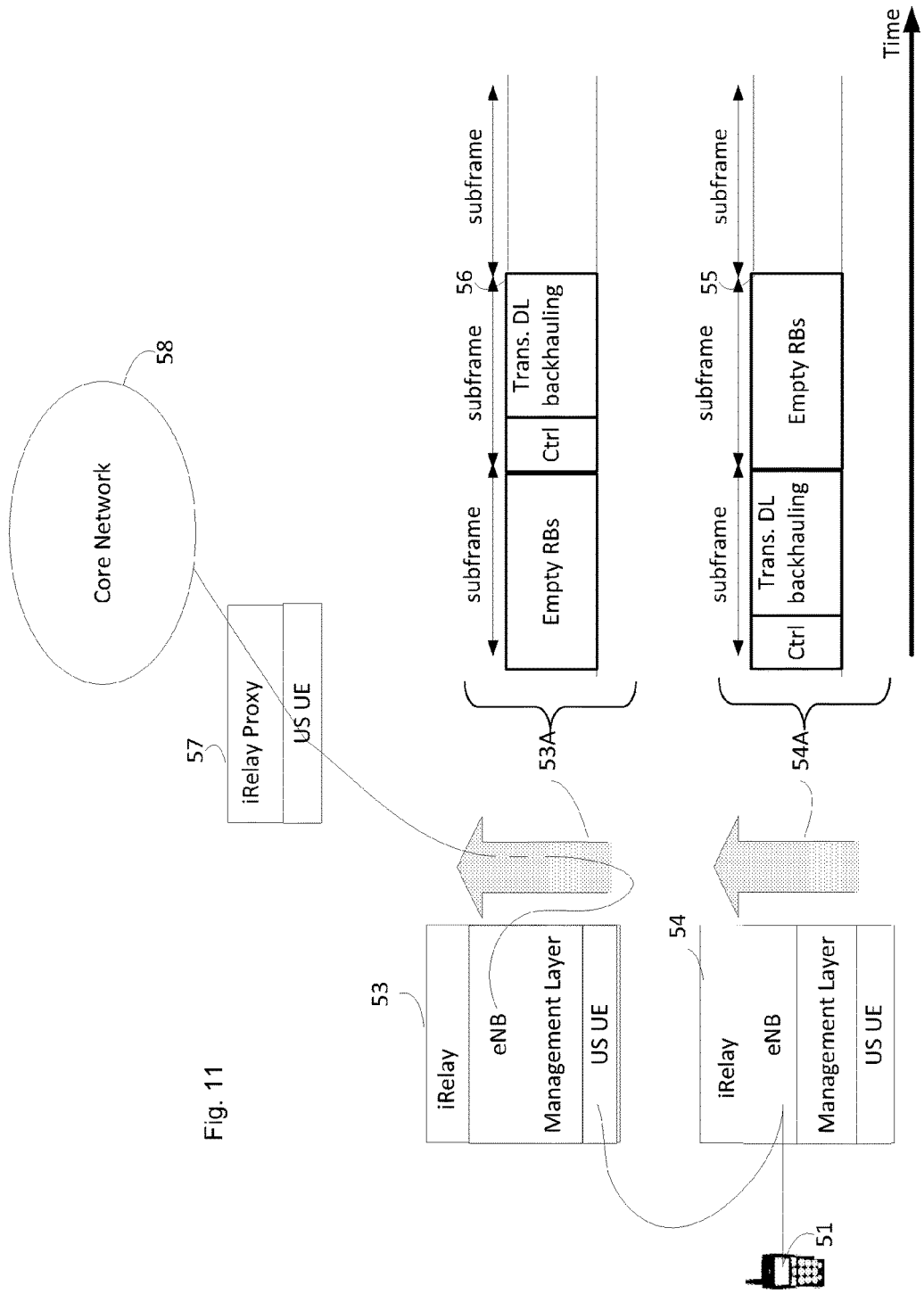
FIG. 11 is an example of use of different subframes to enable multi-relay coordinated transmissions using downlink (DL) channels of an LTE base station (eNB) which resides in an inverse relay (iRelay)

FIG. 11 is an example of subframe intercell interference coordination in the downlink (DL) channel of the LTE base station (eNB), which resides in the inverse relay (iRelay).

The usage of downlink (DL) channels only in order to forward both uplink (UL) and downlink (DL) channels for backhauling links as depicted in FIG. 3, enables using smart intercell interference coordination scheduling, e.g. as described below. This scheduling may be carried out in the resource block or subframe basis in the downlink (DL), and may also be carried out in the uplink (UL) channels.

In the example, when the inverse relay (iRelay) [54] wants to send uplink (UL) backhauling data to its serving inverse relay (iRelay) [53], the LTE base station (eNB) of the LTE base station (eNB) of the inverse relay (iRelay) [54] leaves its subframe resource blocks empty, in order not to interfere with the reception of the data by it co-located upstream (US) LTE mobile station (UE). On the other hand, when inverse relay (iRelay) LTE base station (eNB) [53] wants to send uplink (UL) backhauling data to the relay proxy, LTE base station (eNB) of inverse relay (iRelay) [54] leaves its resource blocks at the same subframe empty.

Figure 12:
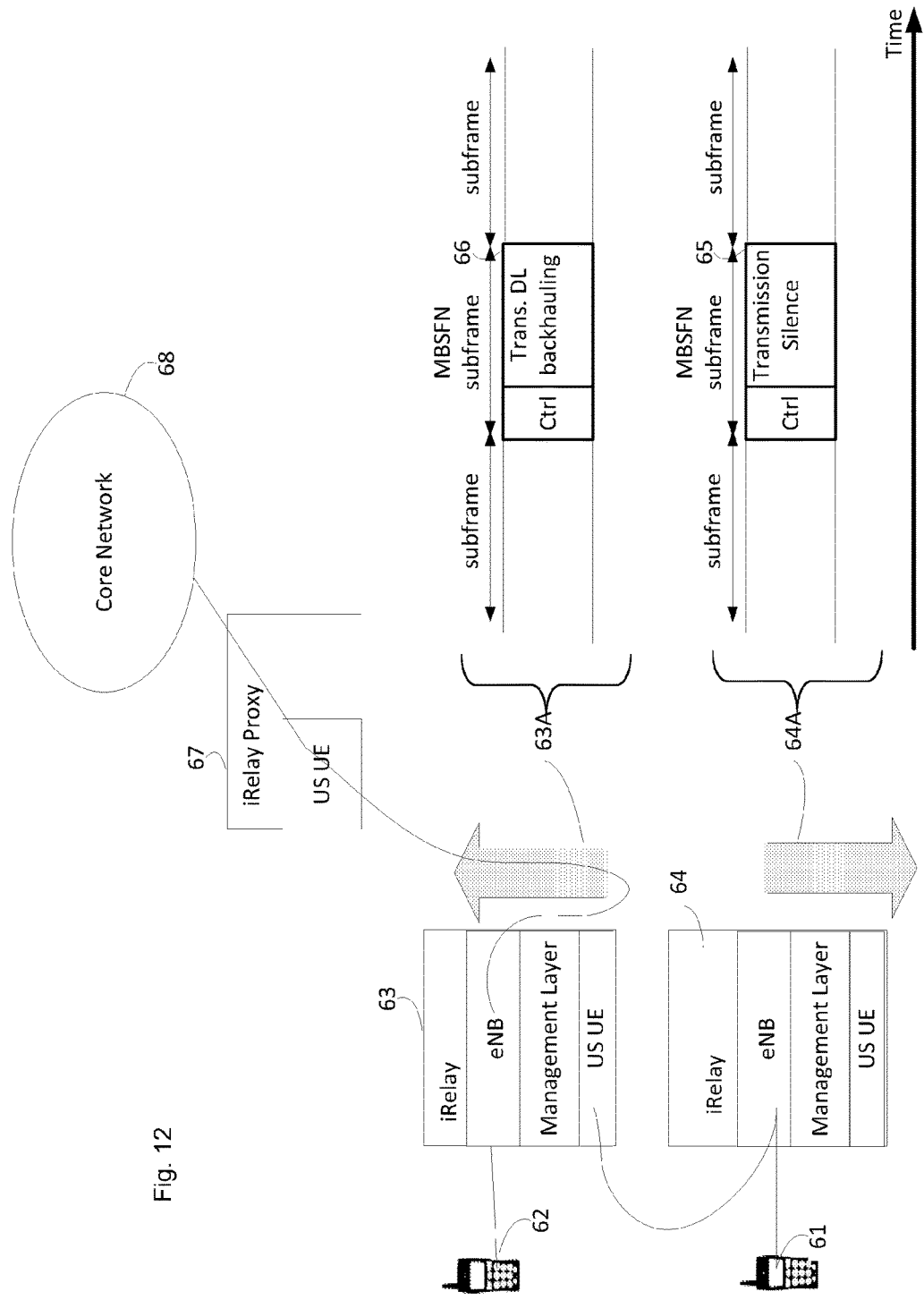
FIG. 12 is an example of use of different subframes to enable multi-relay coordinated transmissions using MBSFN subframes of an LTE base station (eNB) which resides in an inverse relay (iRelay)

FIG. 12 is similar to the example shown in FIG. 11, only in this example the broadcast [e.g. MBSFN] channel of the network is used, e.g. in a TDM method in order to forward uplink (UL) or downlink (DL) backhauling data. Conventional usage of MBSFN in order to cancel interferences between the LTE mobile station (UE) and the LTE base station (eNB) of a relay is shown in 3GPP TR 36.814, using inverse relay (iRelay) architecture, which enables usage of a similar procedure also for the uplink (UL) data.

Figure 13:
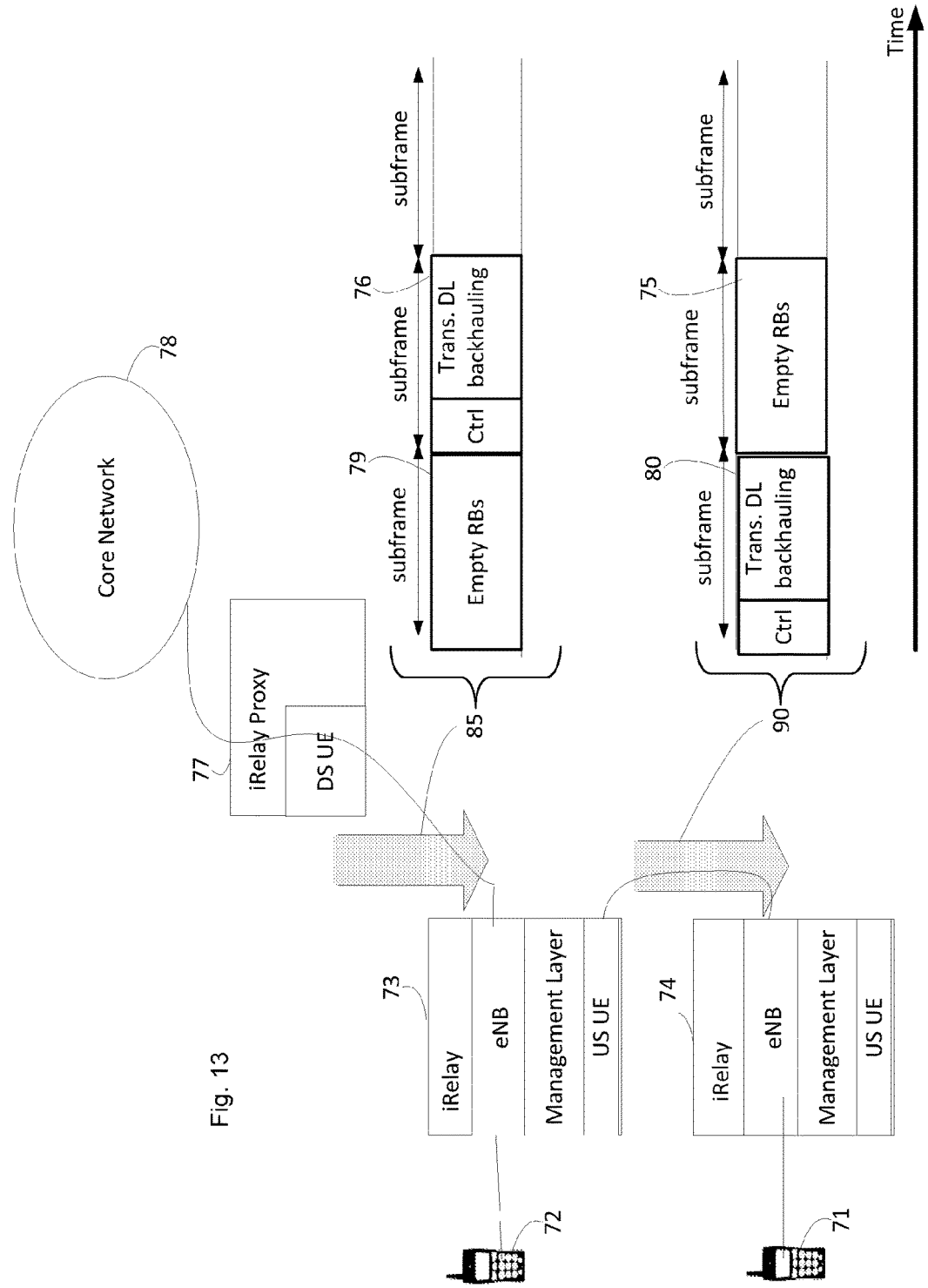
FIG. 13 is an example of use of different subframes to enable multi-relay coordinated transmissions using uplink (UL) channels of an LTE base station (eNB) which resides in an inverse relay (iRelay)

FIG. 13 is similar to the example shown in FIG. 11, only in this example the inverse relay (iRelay) uses uplink (UL) channels. In this example, when inverse relay (iRelay) [73] wants to send backhauling data to inverse relay (iRelay) [74] using its co-located upstream (US) LTE mobile station (UE), inverse relay (iRelay) [73] leaves empty, the resource block of its co-located LTE base station (eNB) [79], e.g. the location where its co-located upstream (US) LTE mobile station (UE) is scheduled to send the data [78]. This can be carried out, for example, by a TDM method. On the other hand, when inverse relay (iRelay) [73] is scheduled to receive backhauling [76] data through the relay proxy and LTE base station (eNB) of inverse relay (iRelay) [73], its co-located upstream (US) LTE mobile station (UE) is not scheduled to transmit [75] any data.

Figure 14:
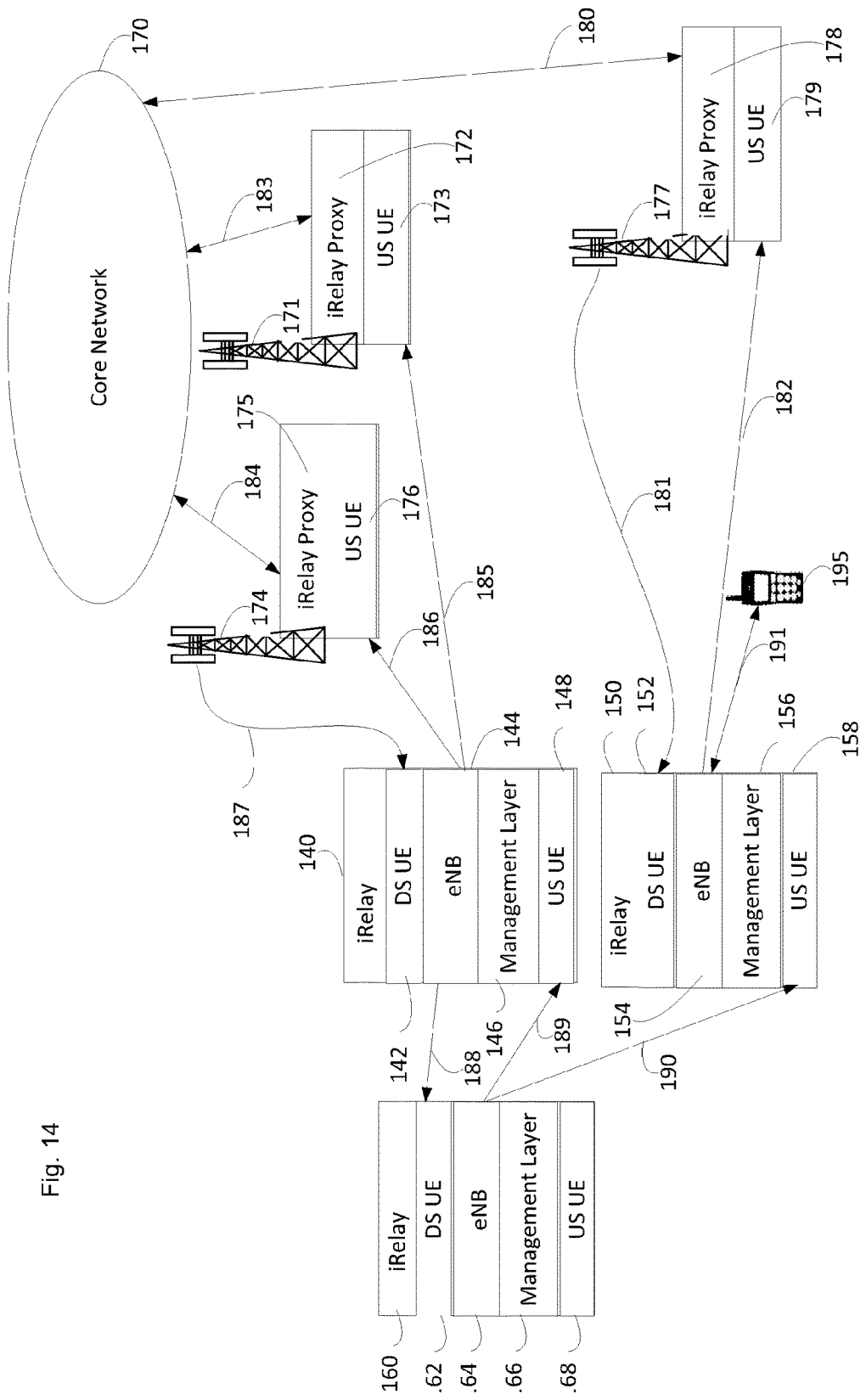
FIG. 14 is an example of use of an inverse relay (iRelay) architecture where each LTE base station (eNB) functionality enables at least one backhauling link using a number of upstream (US) LTE mobile station (UE)s.

FIG. 14 is an example of using the inverse relay (iRelay) architecture where each LTE base station (eNB) enables a backhauling link using a number of upstream (US) LTE mobile stations. In the example there are three relay proxies [172, 175, 177] that are co-located to three stationary base stations [171,174,178] respectively and there are three inverse relays [140, 150, 160].

Inverse relay (iRelay) [160] enables backhauling using backhauling link [142] between an LTE base station (eNB) [144] portion of inverse relay (iRelay) [140] and downstream (DS) LTE mobile station (UE) [162] of inverse relay (iRelay) [160]. Inverse relay (iRelay) [160] is used for downlink (DL) data, but may be used for uplink (UL) data, according to certain embodiments of the present invention.

Link [189] extends between upstream (US) LTE mobile station (UE) [148] portion of inverse relay (iRelay) [140] and LTE base station (eNB) [162] portion of inverse relay (iRelay) [160] and is used for uplink (UL) data, but may be used for downlink (DL) data, according to certain embodiments of the present invention.

Link [190] extends between upstream (US) LTE mobile station (UE) [158] portion of inverse relay (iRelay) [150] and LTE base station (eNB) [162] portion of inverse relay (iRelay) [160] and is used for uplink (UL) data, but may be used for downlink (DL) data, according to certain embodiments of the present invention.

Inverse relay (iRelay) [150] enables backhauling using backhauling link [187] between stationary LTE base station (eNB) [177] and downstream (DS) LTE mobile station (UE) [152] of inverse relay (iRelay) [150] and is used for downlink (DL) data, but may be used for uplink (UL) data, according to certain embodiments of the present invention;

Link [182] extends between the upstream (US) LTE mobile station (UE) [179] portion of Relay proxy [177] and the LTE base station (eNB) [154] portion of inverse relay (iRelay) [150], and is used for uplink (UL) data but may be used for downlink (DL) data, according to certain embodiments of the present invention.

Similarly, inverse relay (iRelay) [140] enables backhauling by using a backhauling link [187] between downstream (DS) LTE mobile station (UE) [142] and stationary base station [174], a backhauling link [186] between upstream (US) LTE mobile station (UE) [176] and LTE base station (eNB) [144] and a backhauling link [185] between LTE base station (eNB) [144] and upstream (US) LTE mobile station (UE) [173]. When an inverse relay (iRelay) [140, 150, 160] wants to send or receive data, the inverse relay may typically use any one of the backhauling links, in order to increase the backhauling capacity. Also, additional backhauling links between the LTE base station (eNB) portion of inverse relay (iRelay) [144, 154, 164] can be added.

Figure 15A:
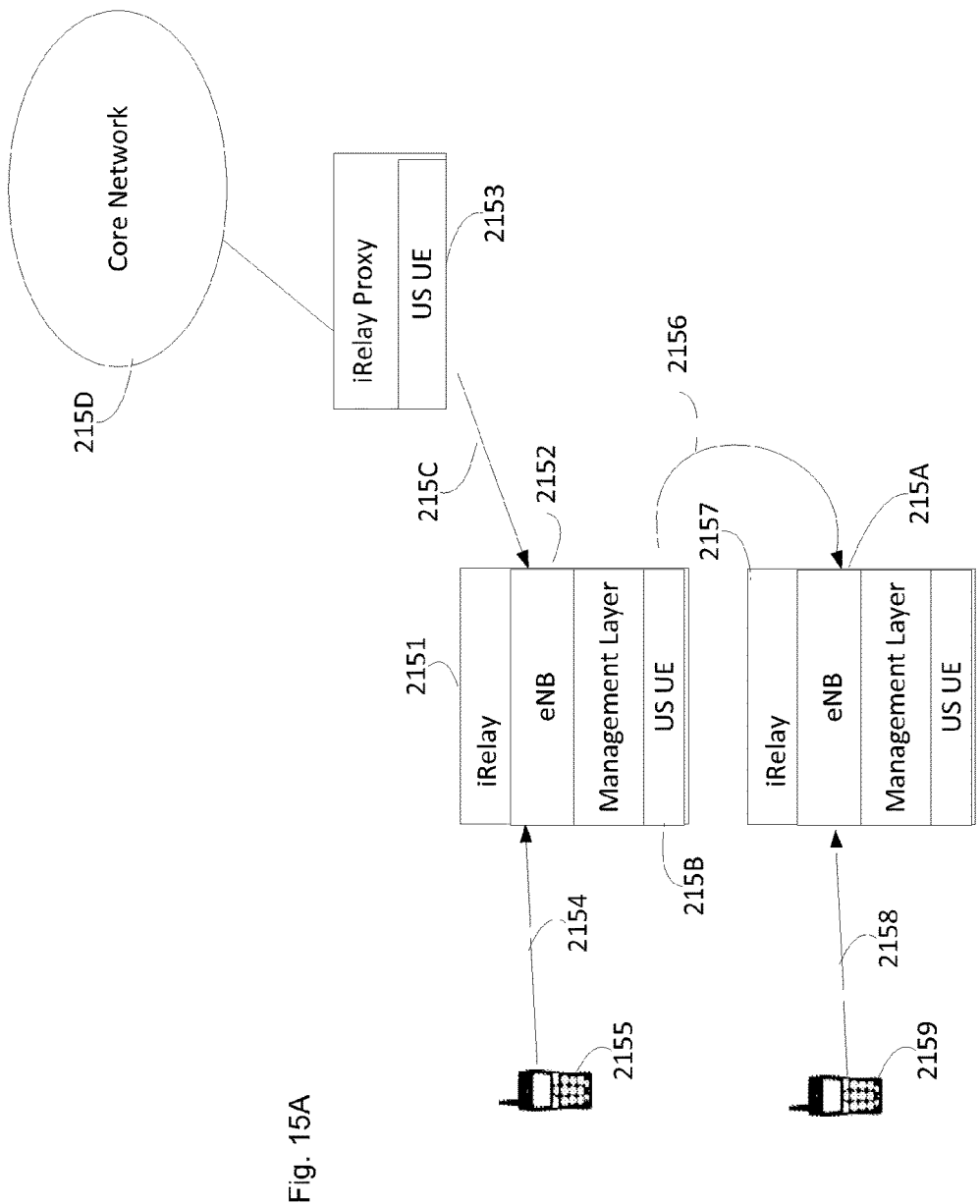
FIG. 15a is an example of usage of a standard measurement report in order to generate a base station scheduling procedure while taking backhauling information into consideration.

FIG. 15 is an example of usage of a standard measurement report in order to consider backhauling information in the base station scheduling procedure. In this example, the LTE mobile station (UE) portion of the inverse relay (iRelay) proxy [2153] sends a standard measurement report (e.g. MeasResults in the 3GPP TS 36.331) to LTE base station (eNB) [2152] of inverse relay (iRelay) [2151]; in this case the link quality (e.g. RSRP, RSRQ) indicates backhauling link quality. Measurement reports of the access link [2154] of mobile station [2155] indicate the access quality portion.

A scheduler that resides inside the LTE base station (eNB) [2152] of inverse relay (iRelay) [2151] and wants to get the backhauling quality in a standard way, may obtain the backhauling quality from the measurement reports of the backhauling links [2152, 2156] and the access link [2154, 2158] and then compute the backhauling links' quality parameters from the measurement results, such as but not limited to RSRP, ISR, RSSI, RSRQ, Ec/No. This may be done by using a combined function e.g. of some or all of the above parameters), such as but not limited to a product or sum thereof, weighted or unweighted, or other increasing or other function of the quality parameters), e.g. in the event that the scheduler wants to get "real" link quality of the multiple hops connection from the UEs [2155, 2159] to the core.

Typically, in order to determine the best available serving base station, a currently serving base station listens to measurement reports of its (anchored) UEs. Then, e.g. by using any suitable option described herein, the currently serving base station decides whether or not to initiate a handover procedure for each anchored LTE mobile station (UE). Taking measurement reports of the LTE mobile station (UE)s and upstream (US) LTE mobile station (UE)s [215b, 2153] into consideration provides a more accurate grade characterizing the full route between the UE (mobile device) and the core that takes into consideration both access links and relevant backhaul links.

The resulting real link quality reflects the quality of the full route, rather than taking into account only the access link ("local link quality"). The real link quality more accurately reflects the service to be given to the mobile device as the link typically must reach the core and then the destination.

Similarly, in order to indicate combined backhauling link (multi-hop consecutive backhauling links from this inverse relay (iRelay) to the core) quality, the LTE mobile station (UE) [215B] portion of the inverse relay (iRelay) [2151] can indicate backhauling quality of its server inverse relay (iRelay) [2157] by using a suitable typically increasing function of the qualities of the backhauling links above (closer to the core) and below (further from the core) inverse relay (iRelay) [2151]. For example, the backhauling link [2156] quality may be multiplied by the measurement report quality of the inverse relay (iRelay [2151])'s backhauling quality [215C]. Or, the 2 quality parameters described above may be otherwise combining (weighted or not), typically using a suitable function such as but not limited to a product or sum, and reporting the result to inverse relay (iRelay) [2157] as a measurement result of the combined backhauling link [2156]. Typically, the full (multi-level) backhauling quality is reflected, in that each of the inverse relay (iRelay)s computes its combined backhauling link quality (above and below the relay), as the qualities iteratively propagate through the network topology tree.

Figure 15B:
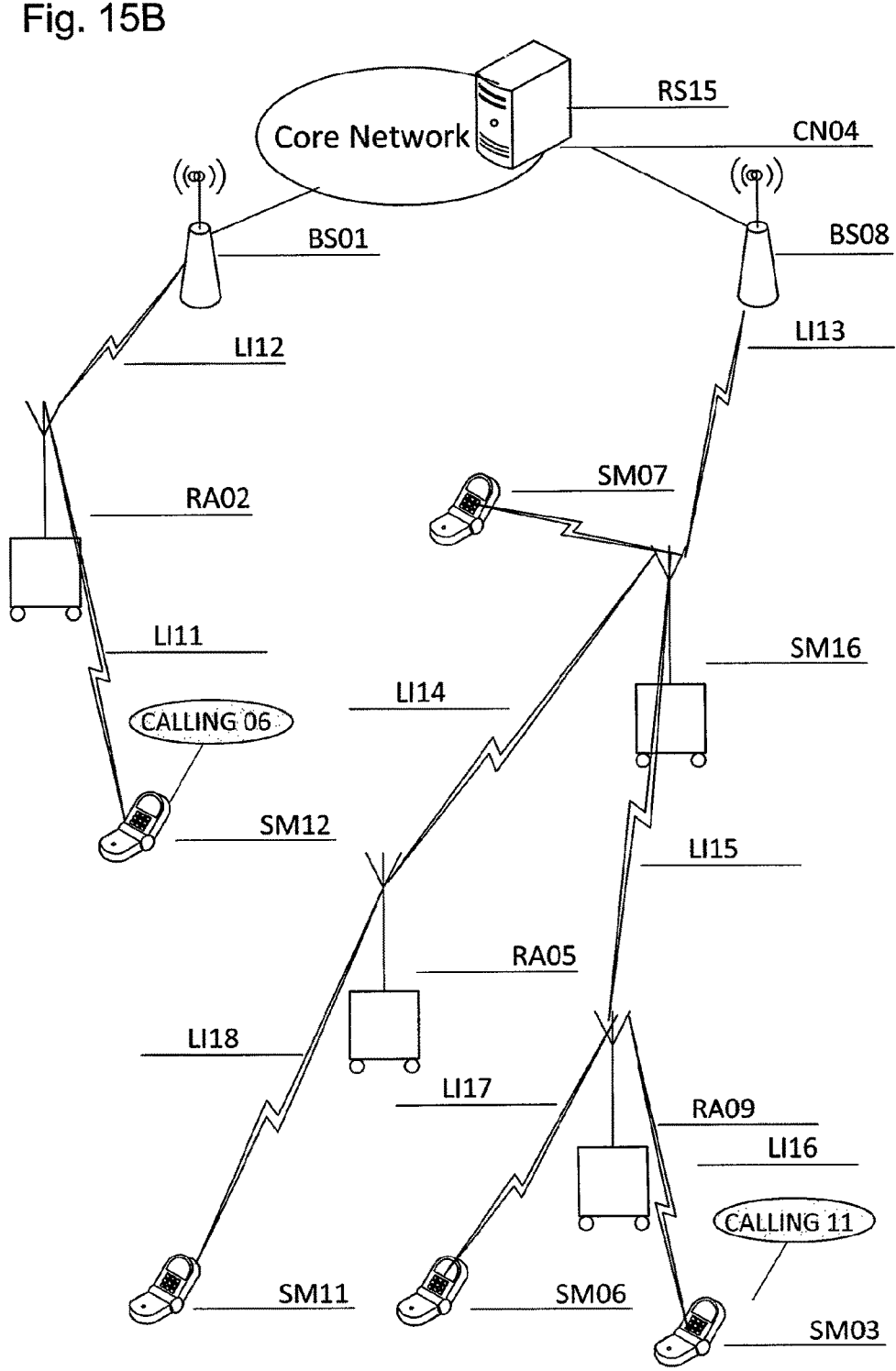
FIG. 15b is an example of a one-to-many architecture useful in conjunction with certain embodiments of the present invention, which is constructed and operative according to the teachings of co-pending PCT Application No. IL2011/050027, entitled "Various Routing Architectures For Dynamic Multi-Hop Backhauling Cellular Network And Various Methods Useful In Conjunction Therewith" and filed 22 Nov. 2011.

FIG. 15b is an example of a one-to-many architecture, e.g. according to the teachings of co-pending PCT Application No. IL2011/050027, entitled "Various routing architectures for dynamic multi-hop backhauling cellular network and various methods useful in conjunction therewith" and filed 22 Nov. 2011. The differences vis a vis the many-to-many architecture of FIG. 16 and vis a vis the many-to-one architecture of FIG. 2 is apparent. It is appreciated that the many-to-many functionality of the apparatus of FIG. 16 typically encompasses both the many-to-one functionality of FIG. 2 and the one-to-many functionality e.g. of the apparatus of FIG. 17.

Figure 16:
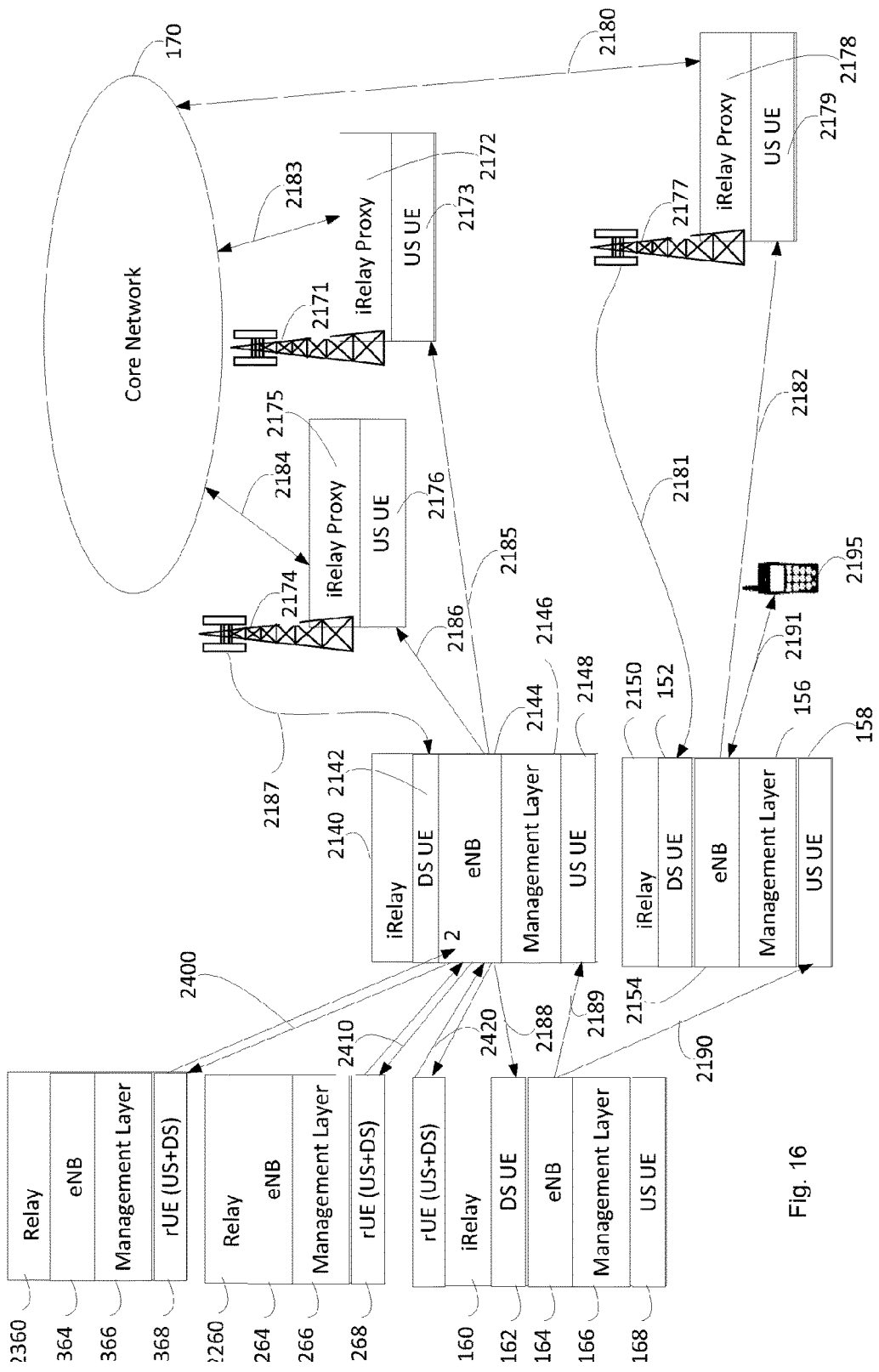
FIG. 16 illustrates an example a cellular hierarchical network that includes both inverse relays (iRelays) and Relays and implements a many to many topology.

FIG. 16 is an example of a cellular hierarchical network that includes inverse relay (iRelay)s apparatuses and Relays apparatuses in a many-to-many topology connectivity. In the example, inverse relay (iRelay) [2140] uses both inverse relay (iRelay) Proxy [2172] and inverse relay (iRelay) Proxy [2175] in order to enable upstream (US) data in a many-to-one connectivity (in the direction from the core outward) and LTE base station (eNB) [2187] in order to enable downstream (DS) data. In addition, Relays [2260], [2360] are connected to inverse relay (iRelay) [2140] in a one-to-many connectivity in order to enable both upstream (US) and downstream (DS).

Inverse relay (iRelay) [2160] uses both inverse relay (iRelay) [2140] and inverse relay (iRelay) [2150] in order to enable upstream (US) and downstream (DS) data in a many-to-one connectivity. The downstream (DS) LTE mobile station (UE) portion [2162] of inverse relay (iRelay) [2160] may explicitly use LTE base station (eNB) portion [2144] of inverse relay (iRelay) [2140] in order to enable downstream (DS) [2188] but it could alternatively use the LTE base station (eNB) portion [2154] of iRelay [2150] similarly.

Inverse relay (iRelay) [2160] comprises a hybrid of inverse relay (iRelay) and Relay combining functions of inverse relay (iRelay) and Relay. Typically, the hybrid inverse relay (iRelay) 160 includes an inverse relay (iRelay) portion including downstream (DS) LTE mobile station (UE) and upstream (US) LTE mobile station (UE) and a Relay portion comprising an rUE, such as but not limited to an LTE-protocol mobile station functionality in the relay, for upstream (US) and for downstream (DS). The hybrid Relay type is advantageous in that it can use any of the backhauling links available, e.g. either of the inverse relay (iRelay) or of the Relay.

For example, if large downstream (DS) bandwidth is needed, the hybrid might use the downlink (DL) using downstream (DS) UE e.g. as previously described above in the context of the inverse relay (iRelay). Or, the hybrid might use the downlink (DL) using rUE [2161] (e.g. as used in Relays). Or, the hybrid might choose to employ both of the above two downlink (DL)s together. In contrast, if large upstream (US) bandwidth is needed, inverse relay (iRelay) [2160] might use uplink (UL) of rUE [2161] or even more preferably downlink (DL) of LTE base station (eNB) [2164] to upstream (US) LTE mobile station (UE) [2148] of inverse relay (iRelay) [2140 and/or upstream (US) LTE mobile station (UE) [2158] of inverse relay (iRelay) [2150] because downlink (DL) bandwidth in LTE, for example, is much larger than uplink (UL) bandwidth.

Thus, a particular advantage of the hybrid described above is availability of several options for upstream (US) and downstream (DS), thereby to provide agility for optimal allocation of links and better topology of the network.

Figure 17:
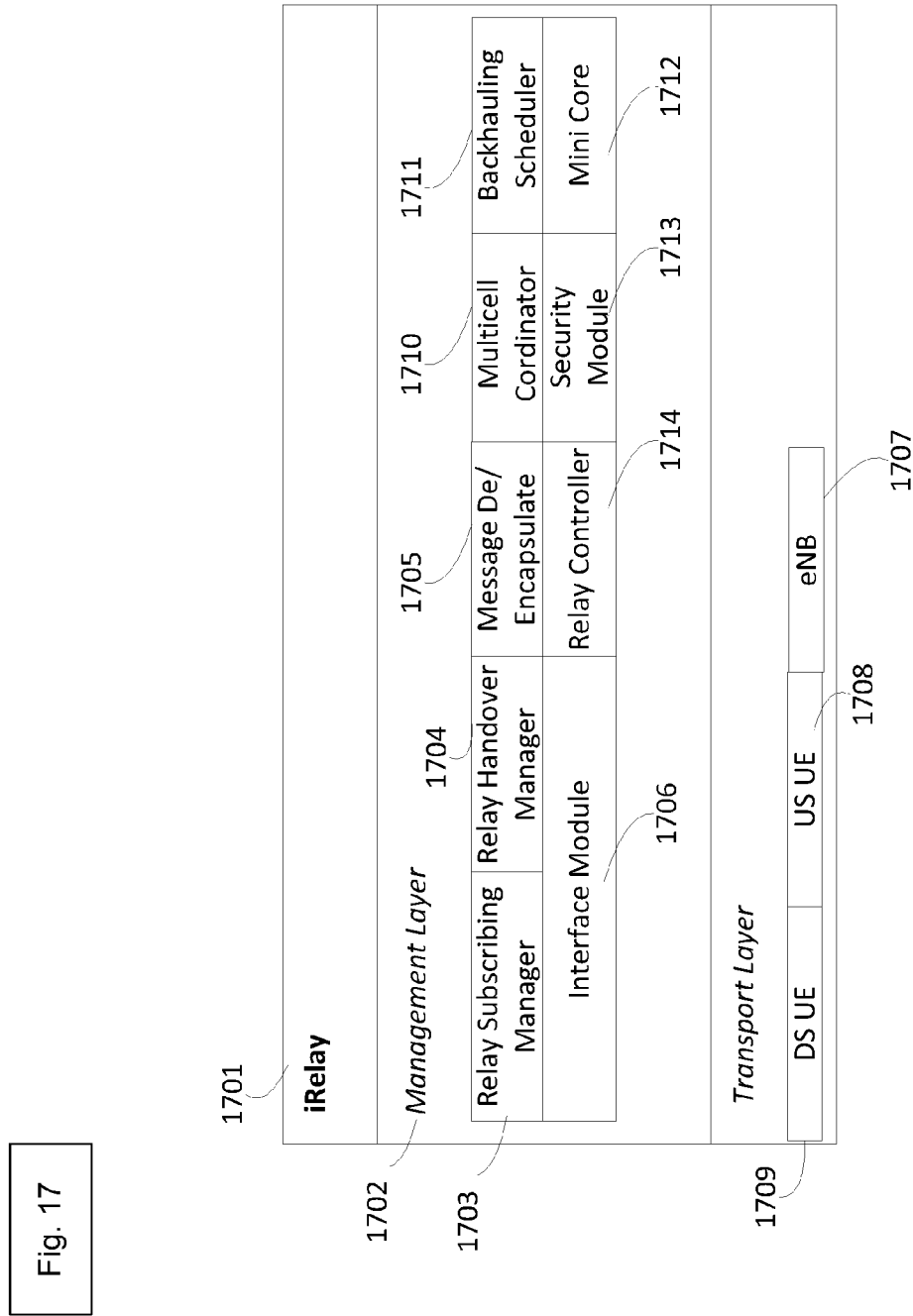
FIG. 17 is a multi-tier architecture of modules residing in an iRelay.

FIG. 17 is a multi-tier architecture of modules, some or all of which may reside in iRelay, The transport layer typically comprises the downstream and upstream user entities DS UE [1709], US UE [1708] and the eNB[1707]. The transport layer typically performs some or all of the following:

(1) sending access data to and receiving access data from the mobile stations and sending the access data to the upper management layer [1702] through the interface module [1706], (2) sending backhauling data to and receiving backhauling data from the mobile stations using downlink channel (e.g. MBSFN) typically through the eNB [170], (3) receiving measurement reports of different eNBs in the area typically through the DS\US UE [1708],[1709].

The management layer typically comprises some or all of: multicell coordinator [1710], backhauling scheduler [1711], message encapsulate and decapsulate [1705], relay handover manager [1704] and relay subscribing manager [1703], interface module [1706], security module [1713], Relay controller [1714] and mini-core [1712], whose typical functionalities are described below Some or all of these modules typically reside in the management layer and communicate with the transport layer e.g. through the interface module [1706].

The multicell coordinator [1710] is typically responsible for inter-cell interference coordination between different relays, for example by scheduling different subframes for every eNB of iRelay when transmitting backhauling links. The multicell coordinator [1710] also typically manages the network topology (e.g manages and stores the links between the different iRelays and chooses the iRelay to connect to). The backhauling scheduler [1711] is typically responsible for scheduling backhauling data through the eNB [1707]. The message encapsulate and decapsulate unit [1705] is typically responsible for decapsulating and encapsulating messages that are received from or sent to the interface module (and thereafter to the transport layer elements), optionally sorting them and re-encapsulating them, and forwarding them according to the source\destination information.

The Relay handover manager [1704] is typically responsible for managing handover of iRelays e.g. from an iRelay to another iRelay or from iRelay to an iRelay proxy (or vice versa) or from an iRelay to a base station (or vice versa), such as for example in FIG. 16, in the event that iRelay

[21600] is in motion and is approaching the iRelay Proxy [2178]. The Relay subscribing manager [1703] is responsible for authentication procedures between iRelays when the iRelays are connecting to one another.

The mini core portion of the management layer is an implementation of a small core that may be employed in the event that an iRelay or group of iRelays do not have a connection to a static network, and therefore to its core network. The mini core typically includes all the functionalities of the relay which enable stand-alone operation of the iRelays. The mini core portion typically serves the mobile station of the iRelay where it is located, and in addition may serve mobile stations connected to iRelays that are connected to the iRelay where it is located. The Mini core of the LTE iRelay typically comprises some or all of the standard portions of an EPC (Evolved Packet Core) network such as; MME (mobility management entity), S-GW (serving GateWay), P-GW (Packet data network GateWay), HSS (Home Subscriber Server), CSCF (Call Session Control Function), PCRF (Policy and Charging Rules Function) and Applications Servers. The relay controller is responsible for the overall control on all the parts of the relay and the coordination between them. The security module is responsible of the security aspects of the relay, such as preventing malwares and viruses from harming various parts of the relay, e.g. by inserting firewalls at the internal and external interfaces of the relay.

The iRelay Proxy typically includes a management layer similar to the management of the iRelay. In addition to the abovementioned elements, the iRelay Proxy typically also includes interfaces to the static core, such that the iRelay proxy does not need the mini core, and accordingly encapsulation and decapsulation capability. The iRelay Proxy may include an X2 interface to a static eNB (or several eNBs) for performing some or all of synchronization, control data transfer and traffic data transfer, an also, optionally, to use the eNB to transfer traffic from the iRelay Proxy to and from the static core network.

Figure 18:
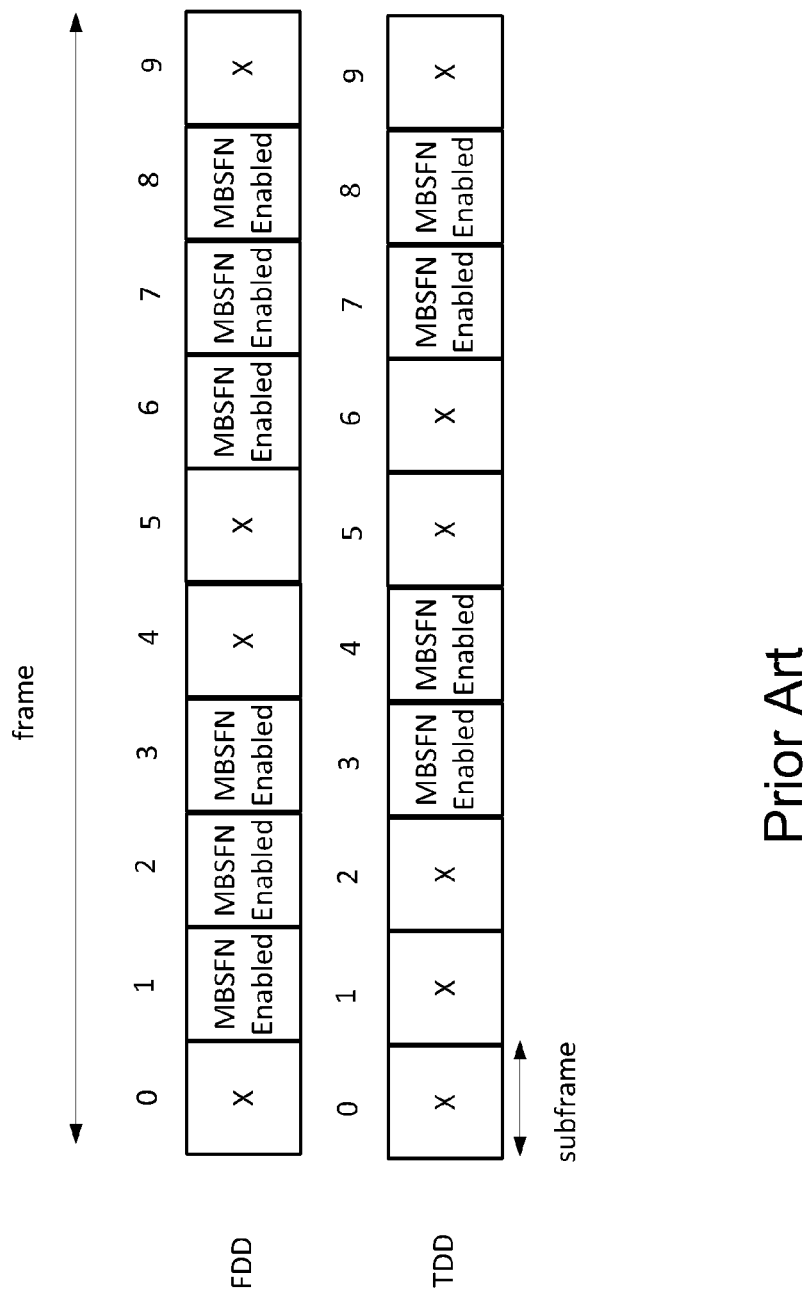
FIG. 18 is an example illustration of available subframes for MBSFN transmitting in both TDD and FDD in LTE, e.g. as in the prior art.

FIG. 18 depicts potential subframes of LTE frame that may be used for MBSFN transmission, in both TDD (Time Division Duplex) and FDD (Frequency Division Duplex) schemes, e.g. as known in the art.

Figure 19:
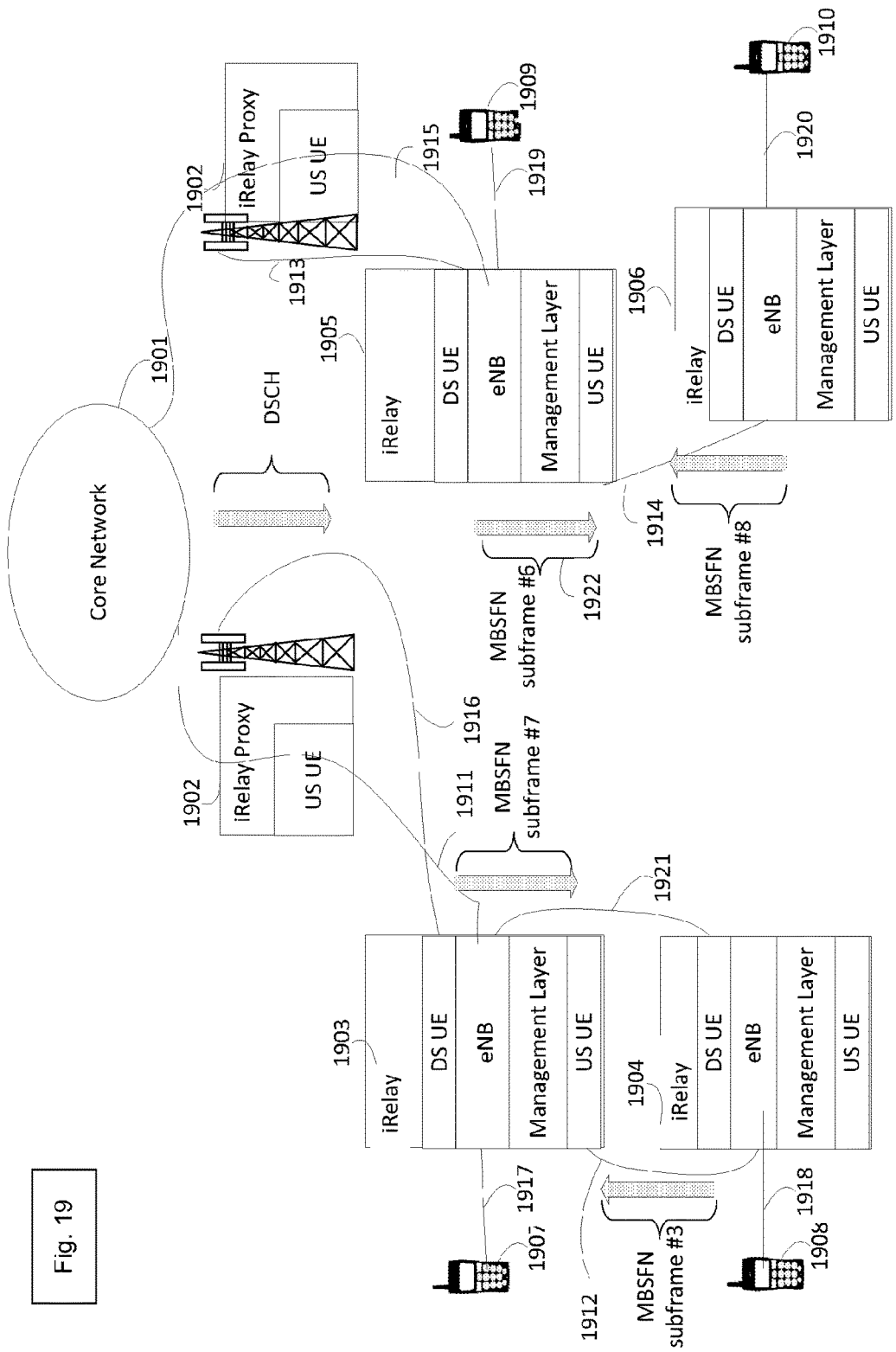
FIG. 19 is an example depicting enablement of backhauling communication in a multihop relay using subframe and intercell subframe interference coordination methods using MBSFN and PDSCH channels.

FIG. 19 is an example illustration of enablement of backhauling communication in a multihop relay using a subframe and intercell subframe interference coordination method which employs MBSFN and PDSCH channels. In the illustrated example, the MS [1908] is connected to iRelay [1904], MS [1907] is connected to iRelay [1903], MS [199] is connected to iRelay [1905] and MS [1910] is connected to iRelay [1906]. iRelay [1904] uses iRelay [1903] as a relay device by broadcasting data over MBSFN channel [1912]. iRelay [1903] receives the broadcast data of iRelay [1904] and Upstreams the broadcast data, adding the iRelay's own backhauling data over a downlink channel [1911] through the iRelay proxy [1902] to the core [1901]. On the downlink side, data is sent on the Downstream through Downlink channel [1916] from the static base station to the DS UE portion of iRelay [1903].

The portion of the DS data that is relevant to the MSs (e.g [1907]) that camp on the eNB portion of iRelay [1903] is typically sent over access link [1917] such that all other DS data that is not relevant to the access link is therefore relevant to backhauling links. In the example DS UE of iRelay [1904] receives backhauling DS data sent over MBSFN channel [1921] to iRelay [1904], the same subframe #7 that is MBSFN and that is used also for [1911]. Similarly, DS data received by iRelay [1904] is partitioned between access and backhauling data. In the example there is only access data being sent over the access link [1918]. Similarly, iRelay [1906] sends US backhauling data using an MBSFN DL channel [1914] to a US UE of iRelay [1905]. iRelay [1905] sends US backhauling data of its access links [1919] with the additional US backhauling data of iRelay [1906] using DL channel [1915] (e.g Physical Downlink Shared Channel (PDSCH) in LTE) through iRelay Proxy [1902].

On the DS, backhauling data is being sent through the stationary station [1913] using DL channel to the DS UE of iRelay [1905], The access portion of the DS data is sent through access links, in the example [1919], to the camped Mobile stations, e.g., in the illustrated example, mobile station [1909]. The backhauling portion of the DS data is forwarded over MBSFN DL channel [1922] to the DS UE portion of iRelay [1906].

It is typically possible to reduce the roundtrip delay of multihop DS and US by dynamically allocating the subframe position according to the topology. For example in FIG. 19 iRelay [1904] allocates subframe #3. The upstream payload that is being sent to iRelay [1904] by MS [1908] in subframe #1 has enough processing time and is able to be sent over the backhauling link at the next hop e.g. after 2 msec on subframe #3. Typically the round trip time in LTE is 20 msec (2 frames). After 20 msec the payload is sent back on the DS, iRelay [1903] has enough processing time and is able to go to the next hop after 4 msec on subframe #7 back to iRelay [1904]. iRelay[1904] can now send the payload data to MS[1908] in about 3 msec in the next frame on subframe #1. So theoretically, an addition of one hop has added 10 msec delay to the roundtrip.

Some designs of relaying functionality may send control information between different relay node, for example informing neighboring nodes about the allocated channels (e.g. which subframe is used) or inform ing that a message had arrived or informing nodes about the allocated channels of the neighbors in order to avoid "hidden terminal" problems. Such a channel may be implemented by adding a control header to the DL channel sent over the MB SFN channel or by sending the control header over a broadcast control channel (e.g. BCH in LTE). For example it is possible to use a public warning system mechanisms (e.g earthquake and Tsunami warning system (ETWS) or Commercial Mobile Alert Service (CMAS)) defined in LTE RRC BCH messages (3GPP TS 36.331) in SIB10, SIB11 and SIB12 in order to send proprietary messages.

Alternatively or in addition, in order to be able to dynamically schedule backhauling information and to be able to serve large number of relay nodes without interfering with one another, only portion of the subframe may be scheduled periodically by using for example LTE Common subframe allocation (CSA). The usage of CSA typically adds large number of orthogonal channels. Scheduling different channels to each relay with the addition CSA flags reduces complexity and may reduce to a map coloring problem with more than 12 unique colors in FDD.

The usage of CSA may also facilitate dynamically enlarging or decreasing allocated backhauling bandwidth that may be used in order to give additional bandwidth in the access links due to addition of users or addition of bandwidth requirements. For example in FIG. 19, mobile station [1908] may require 64 Kbit in a payload size of 20 ms (e.g. a payload is sent every 20 ms). For this requirement it is enough for iRelay [1904] to allocate a subframe every two frames, iRelay [1908] may allocate additional resources in case these are needed. For example an additional 20 subscribers may camp on iRelay [1908] with a payload size of 64 Kbit every 20 msec. iRelay[1908] then may allocate an additional free subframe (i.e subframe#2). As a result iRelay [1903] may enlarge its backhauling allocated size, e.g. by allocating the same subframe (e.g. subframe #2) specifically on the frames that iRelay [1904] does not use (e.g. even and odd frames).

Figure 20:
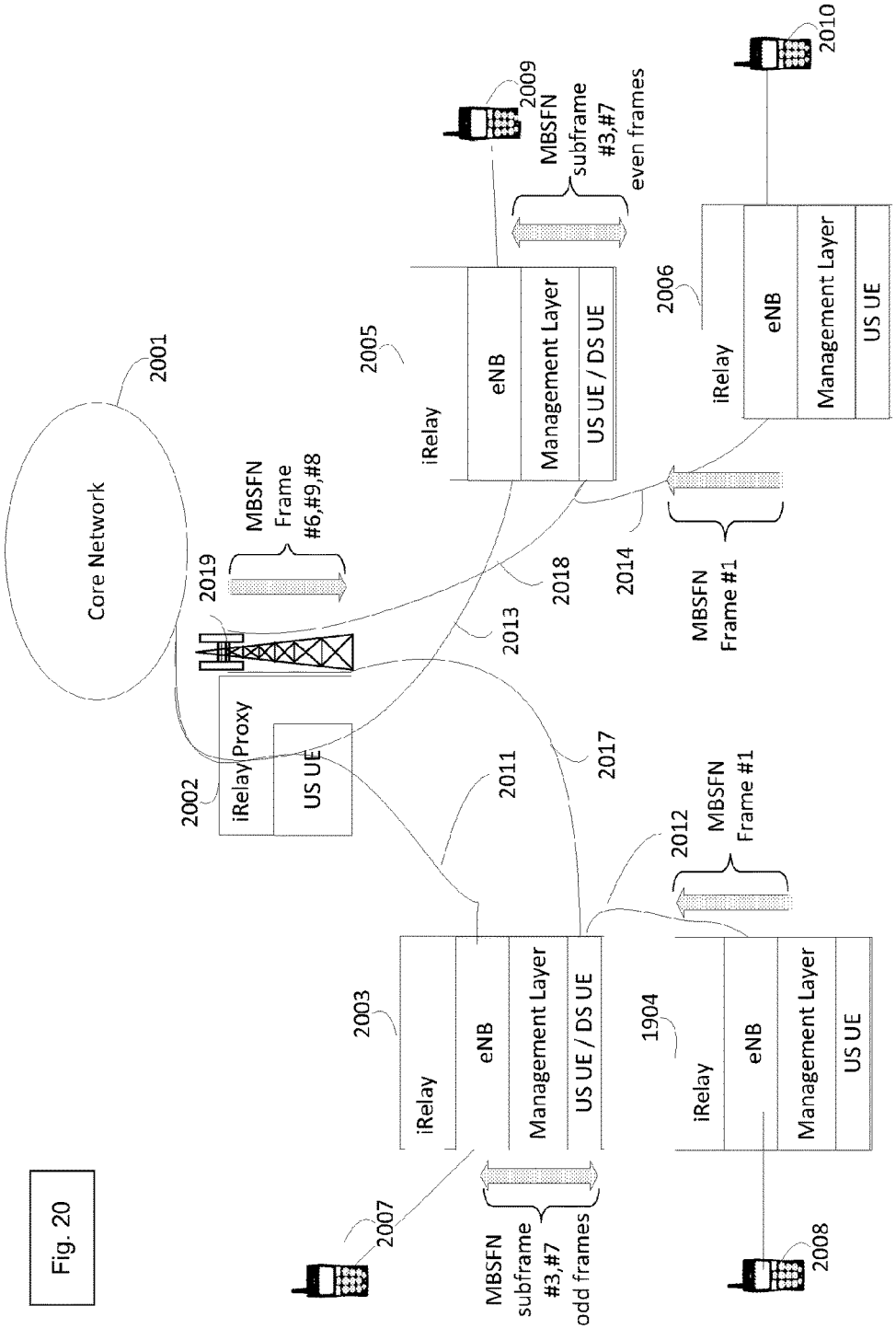
FIG. 20 is an example depicting enablement of backhauling communication in a multihop relay using subframe and intercell subframe interference coordination method using MBSFN channels.

FIG. 20 is similar to the method of FIG. 19 in that it is an example of enabling of backhauling communication in a multihop relay using subframe and intercell subframe interference coordination method using MBSFN channels only. In the example, iRelay [2003] and iRelay [2005] employ MBSFN channels in order to enable US and DS through the core. iRelay proxy [2002] listens to the MBSFN channels and sends US data from iRelay [2003] and iRelay [2005] to the core. On the DS, stationary eNB [2019] sends backhauling DS data to iRelay [2005] and iRelay [2003].

iRelay [2005] and iRelay[2003] may share the same subframe number; they avoid interfering each other by sending messages in different frame pattern, for example odd and even frames. Enabling a system such as that depicted in FIG. 20 may require more corporation with the stationary network than the system depicts in FIG. 19 because the stationary base stations may have to be synchronized to the dynamically changing resource allocations (time synchronized and resource required) of the relay nodes in the system. It is appreciated that US UE and DS UE are functionalities which may be realized using one physical UE device, e.g. when US and DS allocations are non overlapping or orthogonal. This is the case in this embodiment as illustrated (e.g. for the UEs of iRelays [2003] and [2005]).

It is appreciated that the teachings of the present disclosure even insofar as they are in certain senses specific to LTE merely by way of example, would enable an ordinarily skilled man of the art to implement, mutatis mutandis, certain embodiments of the invention in networks complying with various standards and protocols such as but not limited to WiMax, HSPA, WCDMA, GSM, CDMA, and WiFi. For example, certain of these protocols have broadcast or multicast channels that may be used similarly to the MBSFN or BCH channels of the LTE in order to enable the above capabilities and features (e.g. 3GPP TS 25.346 MBMS for HSPA and LTE).

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order.

Any or all of computerized sensors, output devices or displays, processors, data storage and networks may be used as appropriate to implement any of the methods and apparatus shown and described herein.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A cellular communication system operative in conjunction with a cellular network and serving at least one mobile communication device, the system comprising:
at least one backhauling link provided between:
a first relay having a mobile station functionality operatively associated, directly or ultimately, with said at least one mobile communication device served by a core, said mobile station functionality residing in said first relay present at an nth hierarchical level of said cellular network; and
a second relay having a base station functionality present at an mth level of the cellular network, which is below the first relay in which said mobile station functionality resides, and hence is further from the core than said first relay,
wherein said at least one backhauling link provides bi-directional communication between said first relay and said second relay by utilizing downlink channels only.

2. A system according to claim 1 serving said at least one mobile communication device, the system including at least one pair of backhauling links that provides said bi-directional communication between said first relay and said second relay by utilizing said downlink channels only.

3. A system according to claim 2, wherein the network has a core, wherein the system also includes said mobile station functionality connected to the core; and wherein said pair of backhauling links includes a backhauling link via which said mobile station functionality connected directly to the core is served.

4. A cellular communication system according to claim 3, wherein the mobile station functionality is connected to the core through a mobile station-core interface module and is served, via said backhauling link, by base station functionality residing in a topmost level in the hierarchical network.

5. A system according to claim 2, wherein said first relay and said second relay comprises a cellular communication network node which includes an antenna, transmitter and receiver.

6. A system according to claim 2, wherein said first relay and said second relay each comprise a node in a cellular communication network including base stations, the node including an antenna, transmitter and receiver and functioning both as a mobile communication device and a base station and extending the coverage of the network's base-stations.

7. A system according to claim 1, wherein the system also comprises at least one additional pair of backhauling inks that provides bi-directional communication between said first relay and said second relay by utilizing both an uplink channel and a downlink channel.

8. A system according to claim 1, wherein at least one pair of backhauling links provides bi-directional communication between said first relay and said second in different levels by utilizing uplink channels only.

9. A system according to claim 8, implemented by a relay which provides functionality of:
a base station; and
a plurality of mobile stations.

10. A system according to claim 1, wherein all downlink channels comprise MBSFN channels.

11. A system according to claim 10, wherein the MBSFN channels of different relays use different sub-frames.

12. A system according to claim 11, wherein the MBSFN channels of different relays use orthogonal sub-frames.

13. A system according to claim 1, wherein a node that provides mobile station functionality or base station functionality uses both a BCH channel and a MBSFN channel to enable feedback between one node and other node.

14. A system according to claim 1, wherein a node that provides mobile station functionality or base station functionality effects a dynamic allocation of a subframe number and a subframe quantity.

15. A system according to claim 14, wherein said dynamic allocation is derived from at least one mobile station requirements.

16. A system according to claim 1, wherein a node that provides at least one of mobile station functionality and base station functionality uses at least one downlink channel to transmit:
at least one up-stream backhauling link; and
at least one down-stream backhauling link.

17. A system according to claim 1, wherein the system also comprises at least one core and a relay level sequence including at least one relay level, each relay level in the sequence including at least one relay having base station functionality and co-located mobile station functionality, and wherein at least one uplink channel is used to enable down-stream data flow.

18. A system according to claim 17, wherein only uplink channels are used to enable down-stream data flow.

19. A system according to claim 1, wherein the system also comprises at least one core and a relay level sequence including at least one relay level, each relay level in the sequence including at least one relay having base station functionality and co-located mobile station functionality, and wherein at least one downlink channel is used to enable up-stream data flow.

20. A system according to claim 1, wherein the system also comprises at least one core and a relay level sequence including at least one relay level, each relay level in the sequence including at least one relay having base station functionality and co-located mobile station functionality, and wherein only downlink channels are used to enable up-stream data flow.

21. A system according to claim 1, wherein said cellular communication system enables multiple backhauling links between a single entity in a specific layer and more than one entity in higher layers.

22. A cellular communication method useful in conjunction with a cellular network and serving at least one mobile communication device, the method comprising:
   providing at least one backhauling link between:
      a first relay having a mobile station functionality operatively associated, directly or ultimately, with said at least one mobile communication device served by a core, said mobile station functionality residing in said first relay present at an nth hierarchical level of said cellular network; and
      a second relay having a base station functionality present at an mth level of the cellular network, which is below the first relay in which said mobile station functionality resides, and hence is further from the core than said first relay,
   wherein the at least one backhauling link provides bi-directional communication between said first relay and said second relay by utilizing downlink channels only.

23. A method according to claim 22, wherein said first relay and said second relay for providing the at least one backhauling link includes an inverse relay, a relay proxy and a mobile-station-core interface module.

24. A cellular communication method according to claim 23, wherein the relay proxy is configured to decapsulate and encapsulate backhauling control and user data that arrives from to the core.

25. A cellular communication method according to claim 23, wherein the relay proxy is configured to decapsulate and encapsulate backhauling control and user data that is sent to the core.

26. A cellular communication method for serving said at least one mobile communication device according to claim 22, the method including providing at least one pair of backhauling links that provide bi-directional communication between said first relay and said second relay by utilizing downlink channels only.

27. A method according to claim 26, wherein said first relay and said second relay functions both as a mobile communication device and a base station, extending coverage of base-stations.

28. A computer program product comprising a computer readable non-transitory medium having computer readable program code for performing a cellular communication method for serving at least one mobile communication device, the method comprising:
   providing at least one backhauling link between:
      a first relay having a mobile station functionality operatively associated, directly or ultimately, with at least one mobile communication device served by a core, said mobile station functionality residing in first relay present at an nth hierarchical level of said cellular network; and
      a second relay having a base station functionality present at an mth level of the cellular network, which is below the first relay in which said mobile station functionality resides, and hence is further from the core than said first relay,
   wherein the at least one backhauling link provides bi-directional communication between said first relay and said second relay by utilizing downlink channels only.

* * * * *